(12) United States Patent
Bonnissel et al.

(10) Patent No.: US 9,777,959 B2
(45) Date of Patent: Oct. 3, 2017

(54) METHOD FOR LIQUEFYING NATURAL GAS WITH A MIXTURE OF COOLANT GAS

(75) Inventors: Marc Bonnissel, Montigny le Bretonneux (FR); Bertrand Du Parc, Voisins le Bretonneux (FR); Eric Zielinski, Versailles (FR)

(73) Assignee: Saipem S.A., Montigny le Bretonneux (FR)

(*) Notice: Subject to any disclaimer, the term of this patent is extended or adjusted under 35 U.S.C. 154(b) by 822 days.

(21) Appl. No.: 14/126,735

(22) PCT Filed: Jun. 22, 2012

(86) PCT No.: PCT/FR2012/051426
§ 371 (c)(1),
(2), (4) Date: Dec. 16, 2013

(87) PCT Pub. No.: WO2012/175887
PCT Pub. Date: Dec. 27, 2012

(65) Prior Publication Data
US 2014/0116084 A1 May 1, 2014

(30) Foreign Application Priority Data
Jun. 24, 2011 (FR) .................................. 11 55593

(51) Int. Cl.
*F25J 1/00* (2006.01)
*F25B 9/06* (2006.01)
(Continued)

(52) U.S. Cl.
CPC ............. *F25J 1/0022* (2013.01); *C09K 5/041* (2013.01); *C09K 5/042* (2013.01); *F25B 9/06* (2013.01);
(Continued)

(58) Field of Classification Search
CPC .......... F25J 1/0022; F25J 1/005; F25J 1/0072; F25J 1/0282; F25J 1/0283; F25J 1/0284;
(Continued)

(56) References Cited

U.S. PATENT DOCUMENTS 5,916,260 A * 6/1999 Dubar .................... F25J 1/0022
62/613
6,041,620 A * 3/2000 Olszewski ............. C09K 5/045
62/612
(Continued)

FOREIGN PATENT DOCUMENTS

EP 1 939 564 7/2008
EP 2 336 677 6/2011

OTHER PUBLICATIONS

True W R: "Reducing Scale, Increasing Flexibility are Targets of New LNG Designs", Oil and Gas Journal, Pennwell, Houston TX, US Dec. 6, 1999 pp. 54-61, XP001207675.
(Continued)

*Primary Examiner* — Keith Raymond
(74) *Attorney, Agent, or Firm* — Cozen O'Connor

(57) ABSTRACT

A method for liquefying a natural gas primarily including methane, preferably at least 85% of methane, the other components essentially including nitrogen and C2-C4 alkanes, in which the natural gas to be liquefied is liquefied by circulating at a pressure P0 no lower than the atmospheric pressure (Patm), P0 preferably being higher than the atmospheric pressure, in at least one cryogenic heat-exchanger (EC1, EC2, EC3) by a counter-current closed-circuit circulation in indirect contact with at least one stream of coolant gas remaining in the compressed gaseous state at a pressure P1 that is entering the cryogenic heat-exchanger at a temperature T3' that is lower than T3, T3 being the liquefaction temperature of the liquefied natural gas at the pressure P0 at the output of said cryogenic exchanger, characterized in that
(Continued)

the coolant gas includes a mixture of nitrogen and at least one other component selected from among neon and hydrogen.

16 Claims, 12 Drawing Sheets

(51) Int. Cl.
F25J 1/02 (2006.01)
C09K 5/04 (2006.01)

(52) U.S. Cl.
CPC ............ F25J 1/005 (2013.01); F25J 1/0072 (2013.01); F25J 1/0097 (2013.01); F25J 1/0204 (2013.01); F25J 1/0212 (2013.01); F25J 1/0254 (2013.01); F25J 1/0283 (2013.01); F25J 1/0287 (2013.01); F25J 1/0288 (2013.01); C09K 2205/13 (2013.01); C09K 2205/132 (2013.01); F25J 2270/16 (2013.01)

(58) Field of Classification Search
CPC ........ F25J 1/0285; F25J 1/0286; F25J 1/0287; F25J 1/0288; F25J 1/0289; F25J 2270/14; F25J 2270/16
See application file for complete search history.

(56) References Cited

U.S. PATENT DOCUMENTS 6,438,994 B1* 8/2002 Rashad ................... F25B 9/006
62/613
2010/0122551 A1* 5/2010 Roberts ................ F25J 1/0022
62/613
2010/0263405 A1 10/2010 Durand

OTHER PUBLICATIONS

Olve Skjeggedal et al: "Optimising and Scaling up the Brayton Nitrogen Refrigeration Cycle for Offshore and Onshore LNG Applications", GASTECH 2009. The 24th International Conference and Exhibition for the LNG, LPG and natural Gas Industries, May 25-28, 2009, Abu Dhabi, p. 18 XP009144463.

* cited by examiner

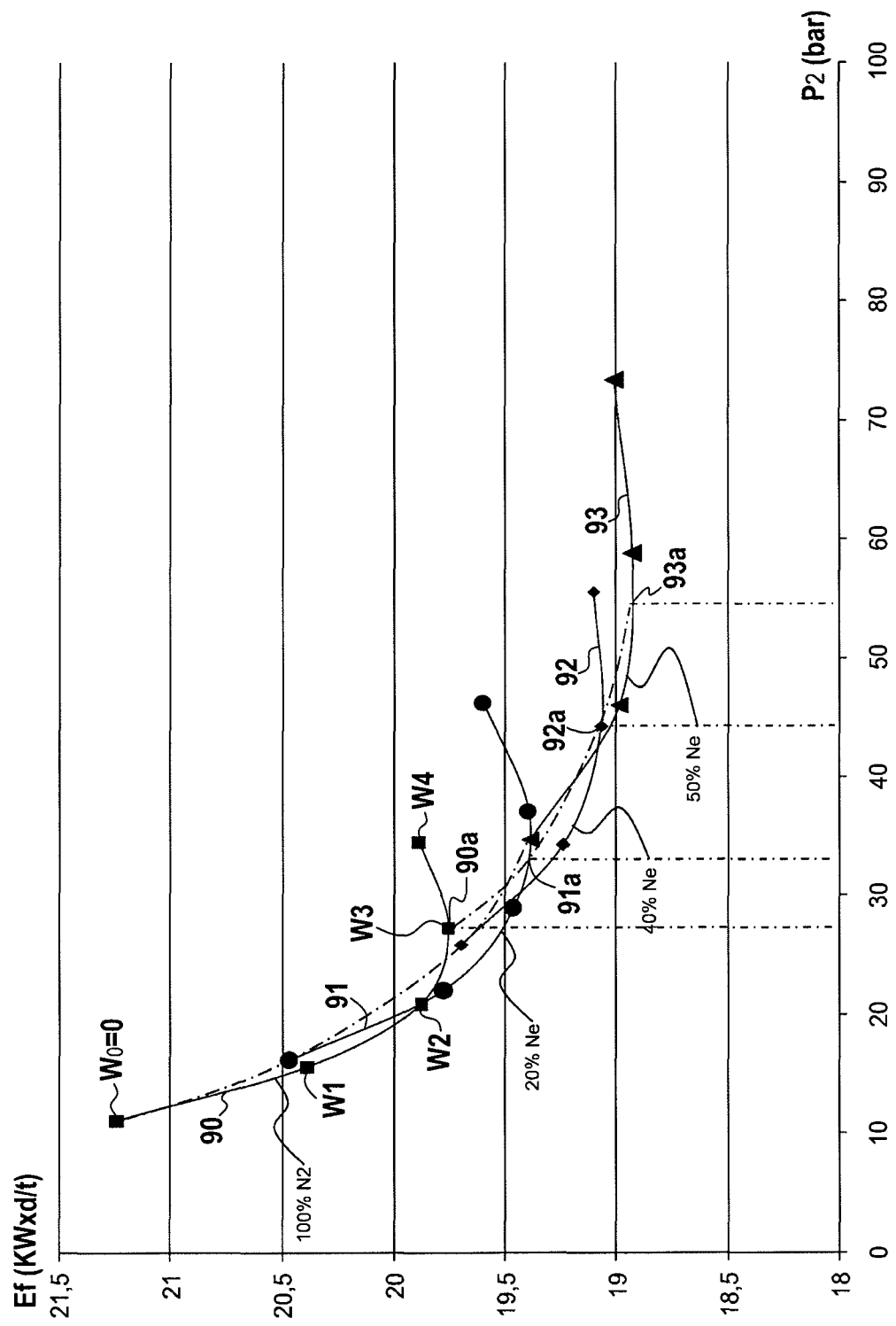

METHOD FOR LIQUEFYING NATURAL GAS WITH A MIXTURE OF COOLANT GAS

CROSS REFERENCE TO RELATED APPLICATIONS

This is a U.S. national stage of application No. PCT/FR2012/051426, filed on Jun. 22, 2012. Priority is claimed on France Application No. FR1155593, filed Jun. 24, 2011, the content of which is incorporated herein by reference.

FIELD OF THE INVENTION

The present invention relates to a process for liquefying natural gas in order to produce liquefied natural gas (LNG). Still more particularly, the present invention relates to liquefying natural gas comprising a majority of methane, preferably at least 85% methane, with the other main constituents being selected from nitrogen and C-2 to C-4 alkanes, i.e. ethane, propane, and butane.

The present invention also relates to a liquefaction installation on board a ship or a floating support at sea, either on the open sea or in a protected zone such as a port, or indeed an installation on land for small or medium natural gas liquefaction units.

BACKGROUND OF THE INVENTION

With an installation on board a ship, the present invention relates more particularly to a process for reliquefying gas on board an LNG transport ship, known as a "methane tanker", said gas for reliquefying being the result of the LNG contained in the tank of said ship heating and evaporating in part, said evaporated gas, generally a majority of methane, being referred to as "boil-off".

The methane-based natural gas is either a by-product of oil fields, being produced in small or medium quantities, in general in association with crude oil, or else it is a major product from a gas field, where it is to be found in combination with other gases, mainly C-2 to C-4 alkanes, $CO_2$, and nitrogen.

When the natural gas is associated in small quantities with crude oil, it is generally treated and separated and then used on site as fuel for turbines or piston engines in order to produce electricity and heat for use in the separation or production processes.

When the quantities of natural gas are large, or indeed substantial, they need to be transported so that they can be used in regions far away, in general on other continents, and in order to do this the preferred method is to transport the gas while it is in the cryogenic liquid state (−165° C.) and substantially at ambient atmospheric pressure. Specialized transport ships known as "methane tankers" possess tanks of very large dimensions with extreme insulation in order to limit evaporation while traveling.

Gas is generally liquefied for transport purposes in the proximity of the production site, generally on land, and that requires substantial installations in order to achieve capacities of several millions of (metric) tonnes per year, with the largest existing units combining three or four liquefaction units, each having a unit capacity of 3 megatonnes (Mt) to 4 Mt per year.

The liquefaction process requires substantial quantities of mechanical energy, with the mechanical energy generally being produced on site by taking a portion of the gas in order to produce the energy needed by the liquefaction process. A portion of the gas is then used as fuel in gas turbines, steam turbines, or piston engines.

Numerous thermodynamic cycles have been developed for the purpose of optimizing overall energy efficiency. There are two main types of cycle. A first type is based on compressing and expanding a refrigerant fluid with a change of phase, while a second type is based on compressing and expanding a refrigerant gas without a change of phase. The terms "refrigerant fluid" and "refrigerant gas" are used to designate a gas or gas mixture circulating in a closed circuit and being subjected to stages of compression, possibly of liquefaction, then of heat exchange with the external medium, and subsequently stages of expansion, possibly of evaporation, and finally of heat exchange with the natural gas for liquefying, which gas comprises methane, and cools little by little to reach its liquefaction temperature at atmospheric pressure, i.e. about −165° C. for LNG.

Said first cycle type with a change of phase is generally used in installations on land and it requires a large amount of equipment and occupies a large footprint. In addition, the refrigerant fluids, generally in the form of mixtures, are constituted by butane, propane, ethane, and methane, which gases are dangerous since in the event of a leak they run the risk of leading to substantial fires or explosions. In contrast, in spite of the complexity of the equipment required, they remain more efficient and they require about 0.3 kilowatt hours (kWh) of energy per kilogram (kg) of LNG that is produced.

Numerous variants of that first type of process with a change of phase in the refrigerant fluid have been developed, and suppliers of technology or of equipment have their own formulations of mixtures associated with their specific equipment, both for so-called "cascade" processes and for so-called "mixed cycle" processes. The complexity of those installations comes from the fact that in those stages where the refrigerant fluid is in the liquid state, and more particularly in separators and in connection pipes, it is appropriate to install gravity collectors in order to bring the liquid phase together and direct it to the cores of heat exchangers where it vaporizes on coming into contact with the methane for cooling and liquefying in order to obtain LNG. Those devices are very bulky, but that does not lead to problems for installations on land, since it is generally simple to obtain an area of land that is large enough to house all of those bulky pieces of equipment side by side. Thus, for installations on land, all of the compressor, heat exchanger, and collector pieces of equipment are generally installed side by side on substantial areas, lying in the range 25,000 square meters ($m^2$) to 50,000 $m^2$, or even more.

U.S. Pat. No. 6,438,994 describes a liquefaction process with phase change in which the refrigerant gas condenses only partially towards the liquid state because it comprises a mixture of a first component selected from argon and nitrogen (which condense to the liquid state at the temperatures and pressures of the process), while the other component is selected from helium and neon (which do not condense to the liquid state).

The second type of liquefaction process, without any change of phase in the refrigerant gas, is an inverse Brayton cycle or a Claude cycle using a gas such as nitrogen. The efficiency of the second type of process is lower, since it generally requires about 0.5 kWh of energy per kg of LNG produced, i.e. about 20.84 kilowatt-days per tonne (kW×d/t), but in contrast it presents a substantial advantage in terms of safety since the cycle refrigerant gas, nitrogen, is inert and thus incombustible, which is very advantageous when the installations are concentrated in a small amount of space, e.g. on the deck of a floating support located in the open sea, where said equipment is often installed on a plurality of levels one above another on an area that is reduced to the strict minimum. Thus, in the event of the refrigerant gas leaking, there is no danger of explosion and it then suffices to reinject into the circuit the fraction of the refrigerant gas that has been lost.

Furthermore, that process for liquefying natural gas without a change of phase is very advantageous on board floating supports since the equipment is of much simpler design, because there is no liquid phase in the refrigerant gas. In such installations, all of the equipment is moving practically continuously as a result of the movements of the floating support (roll, pitching, yaw, lurch, surge, heave). Managing a process with a phase change involving a liquid phase of the refrigerant fluid would then be extremely difficult, even for small movements of the floating support, and indeed practically impossible for extreme movements, whereas stationary installations on land do not face the problem of movements.

In spite of the lower energy efficiency of the liquefaction process without a change of phase of the refrigerant gas, this process remains very advantageous since the equipment used, mainly compressors, expanders, turbines, and heat exchangers is much simpler than the equipment required for a liquefaction process involving cycles with a change of phase in a refrigerant fluid, both in terms of the technology used for said equipment and in terms of maintaining the equipment in an environment that is confined, i.e. on board a floating support that is anchored at sea. Furthermore, the running of such installations in operation remains simpler, since this type of cycle is relatively insensitive to variations in the composition of the gas for liquefying, i.e. a natural gas that is constituted by a mixture in which methane predominates. In the cycle with a change of phase in the refrigerant fluid, in order to ensure that efficiency remains good, the refrigerant fluid needs to be matched to the nature and the composition of the gas that is to be liquefied, and the composition of the refrigerant fluid might possibly need to be modified over time as a function of the composition of the natural gas mixture for liquefying as produced by the oil field.

In principle, implementing a cycle of the liquefaction process without a change of phase in the refrigerant gas, such as nitrogen, comprises the four following main elements:
  a compressor that increases the pressure of the refrigerant gas and causes it to go from ambient temperature at low pressure to high temperature at high pressure;
  a heat exchanger that cools the refrigerant gas from the high temperature at high pressure substantially down to ambient temperature at high pressure;
  an expander device, generally a decompression turbine, in which the refrigerant gas expands: its pressure drops and its temperature is then very low; while simultaneously mechanical energy is recovered from the expansion turbine, which mechanical energy is generally reinjected directly to the compressor that is coupled thereto; and
  a cryogenic heat exchanger through which there flow both the refrigerant gas at cryogenic temperature and also the gas for liquefying, said refrigerant gas absorbing heat from the gas for liquefying, and thus heating up, while said gas for liquefying gives off heat and cools until it reaches the looked-for liquid state. At the end of the heat exchanger cycle, the refrigerant gas is substantially at ambient temperature and it is then reintroduced into the compressor in order to perform a new closed-circuit cycle.

Throughout the duration of the cycle, the refrigerant gas remains in the gaseous state and it circulates in continuous manner, as explained above: it releases its "frigories" little by little, i.e. absorbs calories little by little from the gas that is to be liquefied, i.e. a mixture that is constituted for the most part by methane together with traces of other gases.

The gas for liquefying flows as a countercurrent relative to the refrigerant gas, i.e. said natural gas comprising methane enters the heat exchanger substantially at ambient temperature close to the refrigerant gas outlet where the refrigerant gas is substantially at ambient temperature. Thereafter, the natural gas comprising methane advances into the heat exchanger towards colder zones and transfers its heat to the refrigerant fluid: the natural gas comprising methane cools while the refrigerant gas heats up. As the natural gas comprising methane advances into the heat exchanger, its temperature drops, and at the end of its travel it liquefies and its temperature continues to drop until it reaches a temperature $T3=-165°$ C. for a gas containing 85% methane.

Throughout its passage through the heat exchanger(s), the natural gas is liquefied at a pressure P0 lying in the range 5 bars to 50 bars, in general in the range 10 bars to 20 bars, in four main stages:
  stage 1: cooling the natural gas from ambient temperature T0 down to $T1=-50°$ C. approximately (this temperature depends on the composition of the natural gas);
  stage 2: liquefaction of the natural gas (passing from the gaseous state to the liquid state). Since the natural gas is a mixture of gases at a pressure P0 of a few tens of bars, approximately, this change of state is spread over the temperature range $T1=-50°$ C. to $T2=-120°$ C., approximately;
  stage 3: once the natural gas has liquefied completely (LNG), it is at about $T2=-120°$ C., and still at a pressure P0 of several tens of bars approximately. Within the heat exchanger(s), the LNG continues to be cooled until it reaches the temperature T3 of $-165°$ C., which temperature corresponds to LNG being in a liquid phase at atmospheric pressure; and
  stage 4: the resulting liquid or LNG is then depressurized down to atmospheric pressure where it remains in the liquid state because its temperature T3 is lower than or equal to $-165°$ C., and it can be transferred to an insulated storage tank, or possibly loaded directly on board a transport ship such as a methane tanker.

Stage 2 consumes the most energy, since it is necessary to supply the gas with all of the energy that corresponds to its latent heat of vaporization. Stage 1 consumes a little less energy, and stage 3 consumes least energy, but it takes place at the lowest temperatures, i.e. at temperatures around $-165°$ C.

The values given above for T1, T2, and T3 are appropriate for a natural gas comprising 85% methane and 15% of said other components comprising nitrogen and C-2 to C-4 alkanes, and those temperatures may be significantly different for a gas having a different composition.

FIG. 1 is a diagram of an installation for performing a standard process for liquefying natural gas using a refrigerant gas constituted by nitrogen without a change of phase in the refrigerant gas, as described above, with the description being set out in greater detail below.

EP 1 939 564 describes a pressure for liquefying natural gas of the type without phase change, in which the refrigerant gas is air, i.e. a mixture of nitrogen and essentially oxygen and argon. Oxygen and argon are gases having critical point temperatures that are higher than that of nitrogen, such that this mixture of refrigerant gas (air) requires the pressure of the refrigerant gas to be reduced in order to avoid any condensation towards the liquid state, in comparison with a refrigerant gas constituted solely by nitrogen. Since the mixture is flowing at lower pressure, heat exchange requires greater flow rates and thus pipes of larger diameters and heat exchangers of greater areas, thereby contributing to increasing the cost and the overall size of the installation and reducing the overall thermodynamic efficiency of the process.

SUMMARY OF THE INVENTION

An object of the present invention is to provide a natural gas liquefaction process of the type with no phase change in the refrigerant gas that is suitable for being installed on board a ship or a floating support and that presents improved energy efficiency, i.e. that minimizes the total energy consumed by the process in terms of kWh in order to obtain 1 tonne of LNG, and/or that presents increased transfers of heat in the heat exchangers, and/or that makes it possible to implement a liquefaction installation that is more compact and more efficient.

To do this, the present invention provides a process for liquefying natural gas comprising a majority of methane, preferably at least 85% methane, the other components essentially comprising nitrogen and C-2 to C-4 alkanes, wherein said natural gas for liquefying is liquefied by causing said natural gas to flow at a pressure P0 higher than or equal to atmospheric pressure (Patm), P0 preferably being higher than atmospheric pressure, through at least one cryogenic heat exchanger by flowing in a closed circuit as a countercurrent in indirect contact with at least one stream of refrigerant gas that remains in the gaseous state and that is compressed to a pressure P1 entering said cryogenic heat exchanger at a temperature T3' lower than T3, T3 being the temperature on leaving said cryogenic heat exchanger, and T3 being lower than or equal to the liquefaction temperature of said liquefied natural gas at atmospheric pressure, the process being characterized in that said refrigerant gas consists essentially in a mixture of nitrogen and at least one other constituent selected from neon and hydrogen.

The term "consists essentially" is used herein to mean that traces of other gases at low concentrations, together not exceeding 1%, do not disturb the process nor do they disturb its overall efficiency, and they are therefore acceptable, as explained below.

The inventors have discovered and shown that using a refrigerant gas comprising a mixture of nitrogen and at least one other constituent selected from neon and hydrogen makes it possible to increase the pressure P1 without the dew point of the mixture as made in this way being reached. More particularly, at −170° C., the saturation pressure of a mixture of nitrogen plus neon or of nitrogen plus hydrogen is higher than that of nitrogen alone, thus making it possible to increase the pressure of the mixture without leading to condensation to the liquid state of any of the components in the mixture, because the critical points of neon and of hydrogen are lower than that of nitrogen. Thus, the refrigerant gas does not condense to the liquid state but remains in the gaseous state, even though its pressure is increased very significantly. This leads to an increase in the pressure P3 and thus to an improvement in overall thermodynamic efficiency and to better heat transfer within the cryogenic heat exchangers, thereby increasing the energy efficiency of the process, i.e. minimizing the total energy that is consumed in order to produce a given quantity of LNG in a given length of time, thus making it possible to use installations that are more compact, in particular rotary machines, compressors and turbines, that are more compact and fluid flow pipes that are of smaller section. The refrigerant gas mixture of the present invention is thus particularly advantageous when the process without phase change is used on board a floating support where space is limited.

Both neon and hydrogen present liquefaction temperatures that are lower than that of nitrogen (which is −196° C. at Patm) such that a mixture of the invention presents, at any given pressure, a dew point that is lower than that of nitrogen on its own, and as a result, at the same pressure T3' for nitrogen on its own, the pressure P1 of the mixture of the invention is higher, thereby leading to better thermodynamic efficiency and to better heat exchange conditions, and thus to better energy efficiency of the method in terms of the total energy consumed for liquefying natural gas, where this is generally expressed in terms of kilowatt hours (kWh) per kilogram (kg) or in kilowatt days (kW×d) per metric tonne (t) of LNG that is produced (written kW×d/t, for short).

Preferably, said refrigerant gas mixture consists in a binary mixture of nitrogen and neon. Although the nitrogen-hydrogen mixture presents better overall energy efficiency, neon is preferred given the high risks of explosion of hydrogen and the higher pressure levels P1, P2, and P3 when using a nitrogen-hydrogen mixture, where it is also possible for hydrogen to have a certain propensity to percolate through elastomer gaskets and even through metal walls of small thickness. Neon is therefore preferred over hydrogen since it constitutes an inert gas and does not present danger in a compact installation installed on board a floating support where space is limited.

More particularly, it comprises a mixture of nitrogen and said other component(s) at a molar content for said other component(s) of not more than 50%, and preferably lying in the range 20% to 40%. Above 50%, it is observed that energy efficiency decreases.

Still more particularly in the process of the invention, said natural gas for liquefying is liquefied by performing the following concurrent steps:

a) causing said natural gas for liquefying to flow at a pressure P0 higher than or equal to atmospheric pressure (Patm), with P0 preferably being higher than atmospheric pressure, through at least three cryogenic heat exchangers connected in series and including:
 a first heat exchanger in which said natural gas enters at a temperature T0 and is cooled and leaves at a temperature T1 lower than T0; then
 a second heat exchanger in which said natural gas is liquefied in full and leaves at a temperature T2 lower than T1 and higher than T3; and
 a third heat exchanger in which said liquefied natural gas is cooled from T2 to T3; and b) causing at least one first stream of refrigerant gas in the gaseous state to flow in a closed circuit as a countercurrent at a pressure P1 lower than P3 in indirect contact with and as a countercurrent to the stream of natural gas, said first stream (S1) at a pressure P1 passing through the three heat exchangers, entering into said third heat exchanger at a temperature T3' lower than T3, then entering into said second heat exchanger at T2', lower than T2, then entering into said first heat exchanger at T1' lower than T1, and leaving said first heat exchanger at a temperature T0' lower than or equal to T0;

said first stream of refrigerant gas at P1 and T3' being obtained by using at least a first expander to expand at least a first portion of at least a second stream of refrigerant gas compressed to P3 higher than P1 and flowing as a cocurrent with said natural gas, entering into said first heat exchanger at T0 and leaving said second heat exchanger substantially at T2; and a second portion of said second refrigerant gas stream compressed to P3 flowing as a cocurrent to said natural gas, entering into said first heat exchanger at T0 and leaving said first heat exchanger at substantially T1 is expanded in a second expander to said pressure P1 and to said temperature T2', and is recycled to rejoin said first stream at the inlet of said second heat exchanger; the flow rate D2 of said second portion of the second stream being greater than the flow rate D1 of the first portion of the second stream; and c) said second stream compressed to P3 being obtained by using at least one compressor to compress said first stream of recycled refrigerant gas leaving said first heat exchanger, followed by at least one cooling operation, preferably using at least a first compressor coupled to said first expander; and d) after step a), preferably depressurizing the liquefied natural gas from the pressure P0 to atmospheric pressure, where appropriate.

The separation of the second stream S2 into two different stream portions D1 and D2 at the outlet from the first heat exchanger, preferably with D2 greater D1, is advantageous since the major portion of the energy consumption takes place during stage 2 within the second heat exchanger. Thus, only a minor portion of the flow rate D1 is expanded in order to reach the lowest temperature of substantially −165° C., and it passes through the third heat exchanger EC3 where stage 3 takes place while the stream D1=D1+D2 of the circuit S1 is passing through the cryogenic heat exchanger EC2 in order to perform liquefaction stage 2.

In an embodiment, three compressors are used including at least a first compressor and a second compressor connected in parallel and comprising:

a compressor referred to as the third compressor actuated by a motor, preferably a gas turbine to compress all of said first refrigerant gas stream from P1 to P'3, where P'3 lies in the range P1 to P3; and a first compressor coupled to the first expander consisting in a turbine to compress from P'3 to P3 at least a first portion of said first refrigerant gas stream leaving said first exchanger; and a second compressor coupled to the second expander consisting in a turbine in order to compress from P'3 to P3 at least a second portion of said first refrigerant gas stream leaving said first heat exchanger.

Instead of recycling after expansion a portion D2 of the second stream coming from the outlet of the first heat exchanger, in order to rejoin the first stream at the inlet to the second heat exchanger, in a preferred implementation, this portion D2 of the second stream is recycled to the inlet of the second heat exchanger at an intermediate pressure P2 higher than P1 in a third circuit S3 that is independent of and parallel with the circuit S1, i.e. it flows as a cocurrent with S1. Because the major portion of the energy consumed for stage 2 of the process is transferred with said second heat exchanger, this makes it possible to further increase heat transfers and the energy efficiency of the process.

More precisely, in order to do this, in a preferred implementation of the process of the invention, said liquid natural gas for liquefying is liquefied by performing the following concurrent steps:

a) causing said natural gas for liquefying to flow at a pressure P0 higher than or equal to atmospheric pressure, P0 preferably being higher than atmospheric pressure, through at least three cryogenic heat exchangers connected in series and comprising:

a first heat exchanger in which said natural gas entering at a temperature T0 is cooled and leaves at a temperature T1 lower than T0; then a second heat exchanger in which the natural gas is fully liquefied and leaves at a temperature T2 lower than T1 and higher than T3; and a third heat exchanger in which said liquefied natural gas is cooled from T2 to T3;

b) causing at least two streams of refrigerant gas in the gaseous state and referred to respectively as the first and third streams to circulate in closed circuits at different pressures P1 and P2 passing through at least two of said heat exchangers in indirect contact with and as a countercurrent relative to the natural gas stream and comprising:

a first stream of refrigerant gas at a pressure P1 lower than P3 passing through the three heat exchangers entering into said third heat exchanger at a temperature T3' lower than T3, then entering at T2' lower than T2 into said second heat exchanger, then entering at T1' lower than T1 into said first heat exchanger and leaving said first heat exchanger at a temperature T0' lower than or equal to T0, said first stream of refrigerant gas at P1 and T3' being obtained by using a first expander to expand a first portion of a second stream of refrigerant gas compressed to the pressure P3 higher than P2, said second stream circulating in indirect contact with and as a cocurrent relative to said natural gas stream by entering into said first heat exchanger at T0 and said first portion of the second stream leaving said second heat exchanger substantially at T2; and a third stream at a pressure P2 higher than P1 and lower than P3 circulating in indirect contact with and as a cocurrent relative to said first stream, passing solely through said second and first heat exchangers, entering into said second heat exchanger substantially at a temperature T2' and leaving said first heat exchanger substantially at T0', said third stream of refrigerant gas at P2 and T2 being obtained by using a second expander to expand a second portion of said second stream of refrigerant gas leaving said first heat exchanger substantially at T1, the flow rate D2 of said second portion of the second stream being greater than the flow rate D1 of the first portion of the second stream;

c) said second stream of refrigerant gas compressed to the pressure P3 being obtained by using at least two compressors and by cooling, to compress said first and third streams of refrigerant gas leaving said first heat exchanger at P1 and P2 respectively, preferably by at least first and second compressors connected in series and respectively coupled to said first and second expanders consisting in gas turbines; and d) after step a), preferably depressurizing the liquid natural gas leaving said third heat exchanger at T3 from the pressure P0 to atmospheric pressure, where appropriate.

In yet another preferred implementation, means are used for varying said pressure P2 in controlled manner.

More particularly; in order to do this, at least one compressor is coupled to a motor making it possible to vary at least the pressure P2 in controlled manner by delivering power in controlled manner to said compressor, constituting preferably at least 3% and more preferably 3% to 30% of the total power delivered to all of said compressors in use. Still more particularly, it is observed that when the power injected by said motor is increased, the pressure P1 remains constant, the pressure P2 increases, and the efficiency increases, i.e. the energy consumption expressed in kW×d/t decreases down to a minimum, after which further increasing the power delivered by said motor, in particular above 30% of the total power, causes said energy consumption to increase once more.

Still more particularly, the value of the pressure P2 can be modulated and controlled specifically by connecting the first and second compressors C1 and C2 in series and by coupling the first compressor C1, which is already coupled to the expansion turbine E1, with a first additional motor M1 enabling the pressure delivered at C1 to be modulated and controlled and thus enabling the value of the pressure P2 to be modulated and controlled.

This process is more particularly advantageous since by modulating and controlling specifically the delivery of additional power via M1, it makes it possible to control specifically the value of the pressure P2 of said third stream, and as a result makes it possible to optimize the operating point of the process, i.e. to minimize the energy consumed, in particular when the composition of the natural gas for liquefying varies, as often happens in practice.

Still more particularly, it is observed that when the power injected via said first motor is increased, the pressure P1 remains substantially constant, the pressure P2 increases, and the efficiency increases, i.e. the energy consumption expressed in kW×d/t decreases down to a minimum, after which further increasing the power delivered by said motor, in particular above 30% of the total power, causes said energy consumption to increase once more.

A conventional liquefaction unit is dimensioned in terms of the power levels of available gas turbines, with high power turbines currently delivering 25 megawatts (MW).

In general, it is desired to increase the power of the installation and it is then possible to install two identical gas turbines in parallel in order to obtain twice the power, but there are then two rotary machine lines, which increases overall bulk, increases the quantity of pipework, and naturally increases costs.

By installing a single gas turbine GT that delivers nMW and by adding power of less than nMW via a said second motor M2, the operation of the process is identical in terms of efficiency to that obtained when using two nMW gas turbines in parallel.

Thus, adding power via the second motor M2, preferably using an electric motor, gives greater flexibility in operation and thus enables power to be increased. However overall efficiency remains unchanged.

In contrast, if the same power is delivered via a first motor M1, the overall power remaining the same, then the overall efficiency is improved, which represents a saving in energy consumption for the same overall power, compared with injecting power via the second motor M2.

In the same way, by installing a single gas turbine GT that delivers nMW and by adding power of less than nMW via said turbine GT, the operation of the process is identical in terms of efficiency to that obtained when using two nMW gas turbines in parallel.

Thus, with a gas turbine, the power added via the gas turbine GT, gives greater flexibility in operation and thus enables power to be increased. However overall efficiency remains unchanged.

In contrast, if the same power is delivered via the first motor M1, the overall power is still the same, but the overall efficiency is then improved, which represents a saving in energy consumption for the same overall power delivered, compared with injecting power via the second motor M2.

Thus, as a function of the nature of the natural gas being produced from the underground reservoirs, both in terms of quantity and in terms of quality, it is advantageous to use a gas turbine GT, e.g. a 25 MW gas turbine, continuously at full power with power being added, and where appropriate modulated, by:
  injecting power prior to turbine GT or the second motor M2, without changing overall efficiency; and/or
  by injecting power via the first motor M1, thereby having the effect of improving overall efficiency, up to an optimum, i.e. a minimum of energy consumption.

In a preferred implementation, the series-connected first and second compressors are coupled respectively to said first and second expanders consisting in energy-recovery turbines; and
  at least said first compressor is coupled to a first motor; and
  a gas turbine is coupled either to said second compressor, which compressor compresses said second stream of refrigerant gas directly to P3, or is coupled to a third compressor connected in series after the second compressor, said third compressor compressing said second stream of refrigerant gas from P'3 to P3, said gas turbine delivering the major portion of the total power delivered to all of said compressors in use.

In this implementation, the major fraction of the energy delivered to said compressors is injected via the second and/or third compressors compressing the refrigerant gas stream to high pressure P'3/P3, and the energy recovered from the first and second expanders is reinjected via the first and second compressors serving to compress the refrigerant gas flowing at low and medium pressures P1 and P2. The fraction of the fluid passing through the compressor C1 is a small fraction of the total flow rate (e.g. 10% to 15%) and the energy needed is of the same order of magnitude as the energy recovered by the turbine E1. It is therefore advantageous to couple them together. Furthermore, controlled addition of power at C1 serves to improve the energy efficiency of the system by controlling P1 and P2 independently of each other.

Furthermore, the major portion of the power delivered to the compressors is injected into the compressors that supply the greatest pressure (P'3, P3), thereby making it possible to increase the production capacity of the process, while improving its energy efficiency.

In addition, using said first and second compressors in series and coupled to said first and second expanders in accordance with the present invention, thus makes it possible to improve the compactness of the installation, which is particularly advantageous for performing the process on board a floating support where space is limited.

In the present description, the terms "compressor coupled to an expander/turbine or motor" or indeed "compressor driven by a motor" (or vice versa "expander/turbine or motor coupled to the compressor") are used to mean that the outlet shaft from the turbine or the motor, as the case may be, drives the inlet shaft of the compressor, i.e. transfers mechanical energy to the shaft of the compressor. This is thus mechanical coupling of the compressor to the expander/turbine or respectively of the compressor to the motor.

More particularly, said motor may either be a fuel-burning engine, or else it is preferably an electric motor, or any other installation capable of delivering mechanical energy; the compressors are of the rotary turbine type, also known as centrifugal compressors.

More preferably, in the process, use is made of two series-connected compressors, comprising:

i) a first compressor coupled to said first expander compressing from P1 to P2 all of said first stream of refrigerant gas leaving said first heat exchanger; and ii) a second compressor coupled to said second expander, compressing firstly said third stream of refrigerant gas leaving said first heat exchanger at P2 and secondly said first stream of refrigerant gas compressed to P2 and leaving said first compressor, from P2 to at least P'3, where P'3 is higher than P2 and lower than or equal to P3 in order to obtain said second stream of refrigerant gas at P3 and T0 after cooling; and iii) said first compressor being coupled to a first motor, and said second compressor being coupled to at least one said gas turbine, said first motor making it possible to vary the pressure P2 in controlled manner by delivering power in controlled manner to said first compressor, said first motor delivering at least 3%, more preferably 3% to 30% of the total power delivered to all of said compressors in use, said second compressor driven by a gas turbine delivering 97% to 70% of the total power used.

This first variant implementation is advantageous in that it makes it possible to use an installation that is more compact in terms of the space occupied on board a floating support.

More particularly, use is made of three compressors, including a series connection of first and second compressors, the compressors comprising:

i) a said first compressor driven by a said first motor and coupled to said first expander, compressing from P1 to P2 all of said first stream of refrigerant gas leaving said first heat exchanger; and ii) a said second compressor driven by a said second motor and coupled to said second expander compressing firstly said third stream of refrigerant gas leaving said first heat exchanger at P2 and secondly said first stream of refrigerant gas compressed to P2 and leaving said first compressor, from P2 to P'3, where P'3 is higher than P2 and lower than P3; and iii) a third compressor driven by a said gas turbine to supply the major portion of the energy and to compress from P'3 to P3 all of the first and third streams of refrigerant gas compressed by the second compressor in order to obtain said third stream of refrigerant gas at P3 and T0 after cooling; and iv) said first motor delivers at least 3%, and more preferably at least 3% to 30%, of the total power delivered to all of said compressors in use, said gas turbine coupled to said third compressor and a second motor coupled to the second compressor together supplying 97% to 70% of the total power delivered to all of said compressors in use.

This second variant implementation is advantageous in terms of thermodynamic efficiency and in terms of production capacity since use is then advantageously made of a gas turbine having the maximum capacity that is available on the market, i.e. lying in the range 25 MW to 30 MW for gas turbines designed to be installed on board a floating support, together with a second electric motor having power of 5 MW to 10 MW that is connected to the second compressor, the total power available from the second motor plus the third motor (the gas turbine) then lying in the range 30 MW to 40 MW, and thus being considerably higher than the power available from the largest gas turbine available on the market and suitable for use on board floating supports. Advantageously, the second motor may also be a gas turbine, preferably of power identical to the main gas turbine, thus making it possible to reach an overall power level of 50 MW to 60 MW.

By varying the pressure P2, the process of the invention makes it possible to use a minimum amount of total energy Ef consumed in the process that is lower than 21.5 kW×d/t, and more particularly that lies in the range 18.5 kW×d/t to 20.5 kW×d/t of liquefied gas production.

In general, a gas turbine GT will be operated at full power, and additional power will be delivered via the first motor M1, said additional power delivery being limited to lower than 30% of the total power so as to optimize efficiency at the minimum value lying in the range 18.5 kW×d/t to 21.5 kW×d/t, and then where necessary, the overall power can be increased by injecting power via the second motor M2, and concurrently the power injected via the first motor M1 should be readjusted so that said power is always substantially equal to less than 30% of the overall power so as to conserve the efficiency of the installation at the optimum power in the range 18.5 kW×d/t to 21.5 kW×d/t.

Said optimum efficiency of 19.75 kW×d/t can be obtained for the first motor M1 delivering 24% of the total power when the refrigerant fluid is constituted by 100% nitrogen. When using other refrigerant gases such as neon or hydrogen or nitrogen-neon or nitrogen-hydrogen mixtures, the power percentage and the optimum efficiency vary in the range 18.5 kW×d/t to 21.5 kW×d/t depending on the refrigerant gas or the mixture and on the percentages of neon or hydrogen, but the advantages specified above remain valid and can even be cumulative.

According to other particular characteristics:
the composition of the gas for liquefying lies in the following ranges for a total of 100%:
methane 80% to 100%;
nitrogen 0% to 20%;
ethane 0% to 20%;
propane 0% to 20; and
butane 0% to 20%; and
using the following temperatures:
T0 and T0' lie in the range 10° C. to 35° C. (temperature at AA); and
T3 and T3' lie in the range −160° C. to −170° C. (temperature at DD); and
T2 and T2' lie in the range −100° C. to −140° C. (temperature at CC); and
T1 and T1' lie in the range −30° C. to −70° C. (temperature at CC);
with the following pressures:
P0 lies in the range 0.5 MPa to 5 MPa (5 bars to 50 bars); and
P1 lies in the range 0.5 MPa to 5 MPa; and
P2 lies in the range 1 MPa to 10 MPa (10 bars to 100 bars); and
P3 lies in the range 5 MPa to 20 MPa (50 bars to 200 bars).

BRIEF DESCRIPTION OF THE DRAWINGS

Other characteristics and advantages of the present invention appear in the light of the following detailed description of embodiments given with reference to the accompanying figures, in which:

FIGS. 5 and 5B are graphs plotting total energy consumption (Ef) kW×d/t of LNG produced for a liquefaction process of the invention using a mixture of nitrogen and hydrogen as the refrigerant gas, as a function of the pressure P1 and of various percentages of hydrogen in said mixture;

FIG. 6A is a graph plotting the total energy consumed (Ef) in kW×d/t of LNG produced by a liquefaction process of the invention using a mixture of nitrogen and neon as the refrigerant gas, as a function of the pressure P2 and of various percentages of neon in said mixture;

DETAILED DESCRIPTION OF THE PRESENTLY PREFERRED EMBODIMENTS

Figure 1:
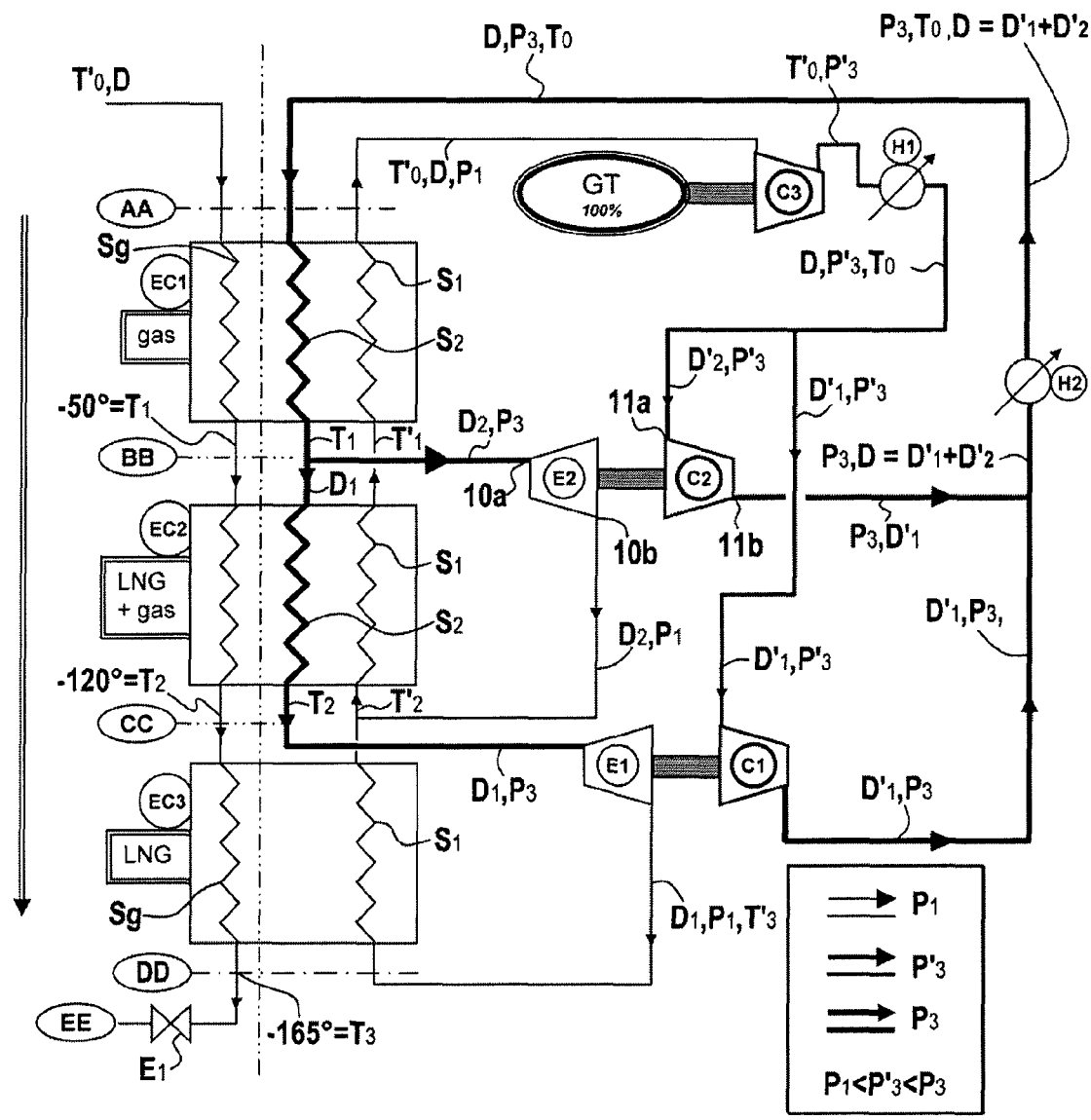
FIG. 1 is a diagram showing a standard liquefaction process with a double loop using nitrogen as the refrigerant gas.

FIG. 1 is a process flow diagram (PFD) for the standard double loop process without phase change using nitrogen as the refrigerant gas. The process uses compressors C1, C2, and C3, expanders E1 and E2, intermediate coolers H1 and H2, and cryogenic heat exchangers EC1, EC2, and EC3. In known manner, the heat exchangers are constituted by at least two circuits that are juxtaposed but that do not communicate with each other in terms of said fluids, the fluids flowing in said circuits exchanging heat all along their paths within such a heat exchanger. Numerous types of heat exchanger have been developed in various industries and in the context of cryogenic heat exchangers, two main types predominate: firstly coiled heat exchangers; and secondly brazed aluminum plate heat exchangers, known as "cold box" heat exchangers.

Heat exchangers of this type are known to the person skilled in the art and they are sold by the suppliers Linde (France) or Five Cyrogénie (France). Thus, all of the circuits of a cryogenic heat exchanger are in thermal contact with one another in order to exchange heat, but the fluids that flow through them do not mix. Each of the circuits is dimensioned so as to minimize head losses at the maximum flow rate of the refrigerant fluid and so as to present sufficient strength to withstand the pressure of said refrigerant fluid as it exists in the loop in question.

In conventional manner, an expander causes the pressure of a fluid or a gas to drop and is represented by a symmetrical trapezoid, its small base representing its inlet $10a$ (high pressure) and its large base representing its outlet $10b$ (low pressure) as shown in FIG. 1 with reference to the expander E2, said expander possibly being merely a reduction in the diameter of the pipe, or else being merely an adjustable valve, but in the context of the liquefaction process of the invention the expander is generally a turbine that serves to recover mechanical energy during said expansion, so that that energy is not lost.

In the same way, and in conventional manner, a compressor increases the pressure of a gas and is represented by a symmetrical trapezoid, with its large base representing the (low pressure) inlet $11a$ and its small base representing the (high pressure) outlet $11b$, as shown in FIG. 1 with reference to the compressor C2, said compressor generally being a turbine or a piston compressor, or indeed a spiral compressor. According to the invention, the compressors C1 and C2 (FIGS. 2 and 3) are preferably mechanically connected to respective motors M1 and M2 that may be electric motors or fuel-burning engines, or any other installation capable of delivering mechanical energy.

Natural gas flows in the circuit Sg and enters at AA into the first cryogenic heat exchanger EC1 at a temperature T0, higher than or substantially equal to ambient temperature, and exits at T1=−50° C. approximately. In this heat exchanger EC1, the natural gas is cooled but it remains in the gaseous state. At BB it passes into the cryogenic heat exchanger EC2 in which temperature extends over the range T1=−50° C. approximately, to T2=−120° C. approximately.

In this heat exchanger EC2, all of the natural gas liquefies into LNG at a temperature of T2=−120° C., approximately, and then the LNG passes at CC into the cryogenic heat exchanger EC3. In this heat exchanger EC3, the LNG is cooled down to the temperature T3=−165° C., which enables the LNG to be discharged from the bottom portion at DD, and then to be depressurized at EE so that the liquid can finally be stored at ambient atmospheric pressure, i.e. at an absolute pressure of 1 bar (i.e. about 0.1 megapascals (MPa)). All along this path of the natural gas along the circuit Sg in the various heat exchangers, the natural gas cools, transferring its heat to the refrigerant gas, which then heats up and needs to be continuously subjected to a complete thermodynamic cycle for the purpose of continuously extracting the heat in the natural gas entering at AA.

Thus, the path of the natural gas is shown on the left of the PFD, and said gas flows downwards along the circuit Sg, its temperature decreasing going downwards from a temperature T0 that is substantially ambient at the top at AA, down to a temperature T3 of about −165° C. at the bottom at DD.

The right-hand portion of the PFD shows the double-loop thermodynamic cycle of the refrigerant gas corresponding to circuits S1 and S2. To clarify explanation, the pressure levels in the main circuits are represented by fine lines for low pressure (P1 in the circuit S1), by medium lines for intermediate pressure (P2), and by bold lines for high pressure (P3 in the circuit S2).

In a conventional circuit as shown in FIG. 1, the stages 1, 2, and 3 are performed by a low pressure loop P1 at very low temperature at the bottom inlet of EC3.

The installation is made up of:
a motor, generally a gas turbine GT that drives the compressor C3 and that delivers all of the mechanical power;
three compressors:
  C3, which compresses all of the refrigerant stream;
  C2, which is coupled to the turbine E2 and which compresses the fraction D'2 of the total stream D; and
  C1, which is coupled to the turbine E1 and which compresses the complementary fraction D'1 of the total stream D;
two turbines:
  E2 directly coupled to the compressor C2 and serving to expand the fraction D2 of the total stream D from the high pressure P3 down to the low pressure P1;
  E1 directly coupled to the compressor C1 and serving to expand the fraction D1 of the total stream D, from the high pressure P3 to the low pressure P1;
a three-portion cryogenic heat exchanger or three heat exchangers in series EC1, EC2, and EC3, corresponding respectively to liquefaction stages 1, 2, and 3, and having three circuits, respectively a natural gas circuit SG and refrigerant gas circuits S1 and S2; and
at least two coolers H1 and H2 situated respectively at the outlet from the main compressor C3 (H1) and on the high pressure loop (H2) before the inlet to the cryogenic heat exchangers.

A cooler H1, H2 may be constituted by a water heat exchanger, e.g. a heat exchanger using sea or river water or using cold air, the heat exchanger being of the fan coil or cooling tower type, such as those used in nuclear power stations.

More precisely, FIG. 1 shows the circuit for a process and an installation in which said natural gas for liquefying is liquefied by performing the following concurrent steps:

a) causing said natural gas for liquefying to flow Sg at a pressure P0 higher than or equal to atmospheric pressure (Patm), with P0 preferably being higher than atmospheric pressure, the gas flowing through the three cryogenic heat exchangers EC1, EC2, EC3 arranged in series and comprising:
  a first heat exchanger EC1 into which said natural gas enters at a temperature T0, is cooled, and leaves at BB at a temperature T1 lower than T0, but at which all of the components of said natural gas are still in the gaseous state; then
  a second heat exchanger EC2 in which the natural gas is liquefied in full and leaves at CC at a temperature T2 lower than T1; and
  a third heat exchanger EC3 in which said liquefied natural gas is cooled from T2 to T3, where T3 is lower than T2 and T3 is lower than or equal to the liquefaction temperature of said natural gas at atmospheric pressure; and b) causing a first stream S1 of refrigerant gas in the gaseous state and compressed to a pressure P1 lower than P3 to flow in a closed circuit in indirect contact with and as a countercurrent to the natural gas stream Sg, said first stream S1 at a pressure P1 passing through the three heat exchangers EC3, EC2, and EC1, entering at DD into said third heat exchanger EC3 at a temperature T3' lower than T3 and then leaving said third heat exchanger and entering said second heat exchanger EC2 at CC at a temperature T2' lower than T2, and then leaving the second heat exchanger and entering the first heat exchanger EC1 at BB at a temperature T1' lower than T1, and leaving said first heat exchanger EC1 at AA at a temperature T0' lower than or equal to T0;
  said first stream S1 of refrigerant gas at P1 and T3' being obtained by using in a first expander E1 to expand a first portion D1 of a second stream S2 of refrigerant gas compressed to P3 higher than P1 flowing as a cocurrent to said natural gas entering said first heat exchanger EC1 at AA and at P0, and leaving said second heat exchanger EC2 at CC and substantially at T2; and
  a second portion D2 of said second stream S2 of refrigerant gas compressed to P3 flowing as a cocurrent to said natural gas entering said first heat exchanger EC1 at AA and at T0 and leaving said first heat exchanger substantially at T1 is expanded in a second expander E2 to said pressure P1 and to a said temperature T2', and is recycled to join said first stream at the inlet at CC of said second heat exchanger; and c) said second stream S2 compressed to P3 is obtained by compression using three compressors C1, C2, and C3 followed by at least two coolers H1 and H2 acting on said first stream S1 of recycled coolant gas leaving said first heat exchanger EC1 at AA via a first compressor C1 coupled to said first expander E1; and d) after step a), the liquefied natural gas is depressurized from the pressure P0 to atmospheric pressure.

More precisely, in FIG. 1, three compressors are used including first and second compressors that are connected in parallel, the three compressors comprising:
  a third compressor C3 driven by a motor, preferably a gas turbine GT, to compress all of the first stream of refrigerant gas coming from the outlet at AA from said first heat exchanger EC1 from P1 to P'3, where P'3 lies in the range P1 to P3; and
  a first compressor C1 coupled to the first expander E1, which is constituted by a turbine, to compress from P'3 to P3 a portion D1' of said first stream of refrigerant gas as compressed by the third compressor C3; and
  a second compressor C2 coupled to the second expander E2, which is a turbine, to compress from P'3 to P3 a portion D2' of said first stream of refrigerant gas as compressed by the third compressor C3.

In FIG. 1, C1 and C2 are thus connected in parallel and they operate between the medium pressure P'3 and the high pressure P3 on all of the stream coming from C3.

The refrigerant gas leaving the heat exchanger EC1 at the high outlet at AA from the circuit S1 has a flow rate D: it is at low pressure P1 and at a temperature T'0 that is perceptibly lower than T0 and at ambient temperature. It is then compressed in C3 to the pressure P'3, after which it passes through a cooler H1. The fluid at flow rate D is then split into two portions presenting flow rates D1' and D2' that are fed respectively to the compressors C1 (D1') and C2 (D2') that are operating in parallel. The two streams at the pressure P3 are then reunited and then cooled substantially to ambient temperature T0 by passing through the cooler H2. This total flow then enters into the top of the cryogenic heat exchanger EC1 via the circuit S2, and then at the outlet from the first level at BB, a large portion of the stream at flow rate D2 (D2 greater than D1) is extracted and directed to the turbine E2 coupled to the compressor C2. The remainder of the flow D1 passes through the second stage of the cryogenic heat exchanger EC2, and then at CC it is directed to the turbine E1 coupled to the compressor C1.

At the outlet from the turbine E1, the refrigerant gas at a temperature T3' lower than T3=−165° C., is then directed downwards from the cryogenic heat exchanger EC3 into the circuit S1 and rises as a countercurrent to the gas for liquefying that is flowing along the circuit Sg, thereby performing the final stage 3 of the liquefaction.

The flow D2 of refrigerant gas coming from the turbine E2 is at a pressure P1 and at a temperature T2 of about −120° C. and it is recombined within the circuit S1 with the flow D1 coming from the turbine E1 via the top outlet from the cryogenic heat exchanger EC3 at CC.

The separation of the second stream S2 into two portions having different flow rates D1 and D2 at the outlet BB from the first heat exchanger, preferably with D2 greater than D1, is advantageous since most of the energy consumption takes place during stage 2 within the second heat exchanger EC2. Thus, only a minor portion of the flow rate D1 passes through the third heat exchanger EC3 where stage 3 takes place, while the total flow D=D1+D2 of the circuit S1 passes through the cryogenic heat exchanger EC2 in order to perform liquefaction stage 2 (from temperature T1=−50° C. to T2=−120° C.).

The same flow D of the circuit S1 finally passes through the cryogenic heat exchanger EC1 in order to perform stage 1 of the liquefaction process (from temperature T1=−50° C. to temperature T0=ambient temperature). At the top outlet from the cryogenic heat exchanger EC1, the flow D of the circuit S1 is at the temperature T0' that is perceptibly lower than ambient temperature. Thereafter, the flow D is once more directed to the compressor C3 in order to perform a new cycle in continuous manner.

In this configuration, the compressors C1 and C2 run in parallel and they need to provide the highest pressure level in the cycle. The two compressors C1 and C2 handle different flow rates of refrigerant fluid, respectively D1' and D2', and they are directly coupled to the turbines E1 and E2, which likewise handle different flow rates, respectively D1 and D2.

The following relationship applies:

$$D1+D2=D=D'1+D'2$$

where D1 is different from D'1 and D2 is different from D'2. In practice, and preferably D1/D=5% to 35%, and preferably 10% to 25%.

Thus, in that type of installation, all of the power is injected into the system via the compressor C3 (by the gas turbine GT), with the power transfers via the turbine and compressor pairs E2-C2 and E1-C1 varying as a function of the pressures in the various circuits (P1, P2, P3), as a function of the temperature levels at the inlets to the cryogenic heat exchangers, and as a function of the heat transfers within each of said cryogenic heat exchangers.

Thus, such an installation presents an operating point that self-stabilizes at a given level of energy consumption Ef which is generally expressed in terms of kW×d/t, i.e. kW-days per tonne of LNG produced, or indeed kWh per kg of LNG produced, said operating point possibly being totally unstable in certain circumstances. It is then very difficult to control the pressures in the high and low pressure loops independently of each other. This may be found to be necessary in the event of variations in the composition of the natural gas for liquefying. It is possible to modify the streams by locally constraining the flows D1, D'1, D2, D'2 in full or in part, e.g. by creating localized head losses, however such arrangements lead to losses of energy and thus to a drop in the overall efficiency of the liquefaction installation.

Figure 4:
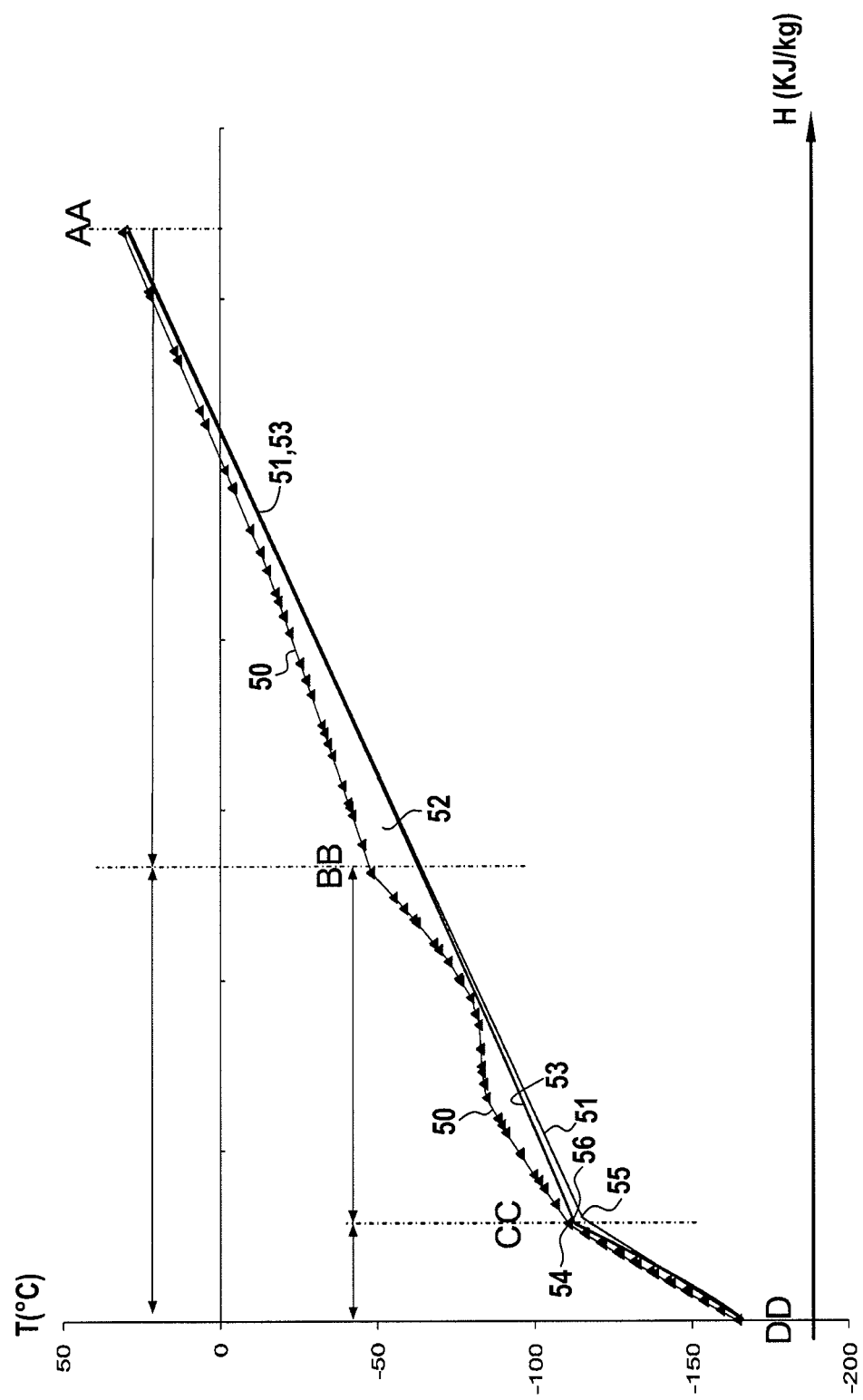
FIG. 4 is a cooling and liquefaction diagram for natural gas in the context of a liquefaction process of the invention, plotting the enthalpy of the natural gas and of the refrigerant fluid in kilojoules per kilogram (kJ/kg) as a function of temperature from T0 to T3.

The graph of FIG. 4 shows how enthalpy H expressed in kJ/kg of LNG production varies in a natural gas liquefaction process. This graph of FIG. 4 is the result of theoretical calculation relating to a natural gas having a majority of methane (85%), with the balance (15%) being made up of nitrogen, ethane (C-2), propane (C-3), and butane (C-4).

The graph shows:
  stage 1 of cooling the natural gas between points AA and BB and corresponding to the heat exchanger EC1 in the PFD of FIG. 1, corresponding to temperatures lying between ambient temperature T0 and T1=−50° C.;
  stage 2 of natural gas liquefaction between points BB and CC, corresponding to the stage EC2 of the PFD of FIG. 1, and corresponding to temperatures lying in the range T1=−50° C. to T2=−120° C.; and
  stage 3 of cooling the LNG between points CC and DD, corresponding to the heat exchanger EC3 of the PFD of FIG. 1, and corresponding to temperatures lying in the range T2=−120° C. to T3=−165° C.

Curve 50 made up of triangles shows the variations in the enthalpy H of the fluids flowing as cocurrents in the circuits Sg and S2 as a function of the temperature of the gas for liquefying comprising methane and/or LNG for an ideal virtual process.

The curve 51 corresponds to the variation in the enthalpy H of the refrigerant gas flowing in the circuit S1 of FIG. 1, and thus represents the energy transferred to the circuits Sg and S2 during the liquefaction process.

The area 52 lying between the two curves 50 and 51 represents the overall loss of the energy Ef consumed in the liquefaction process: this area should therefor be minimized in order to obtain the best efficiency. In land-based processes involving a change of phase in the refrigerant fluid, the curve 51 is not straight, but rather comes close to the theoretical curve 50, thereby implying smaller losses, and thus better efficiency, but the process with a change of phase in the refrigerant fluid is not suitable for use in liquefaction on board a floating support and in an environment that is confined.

Figure 2:
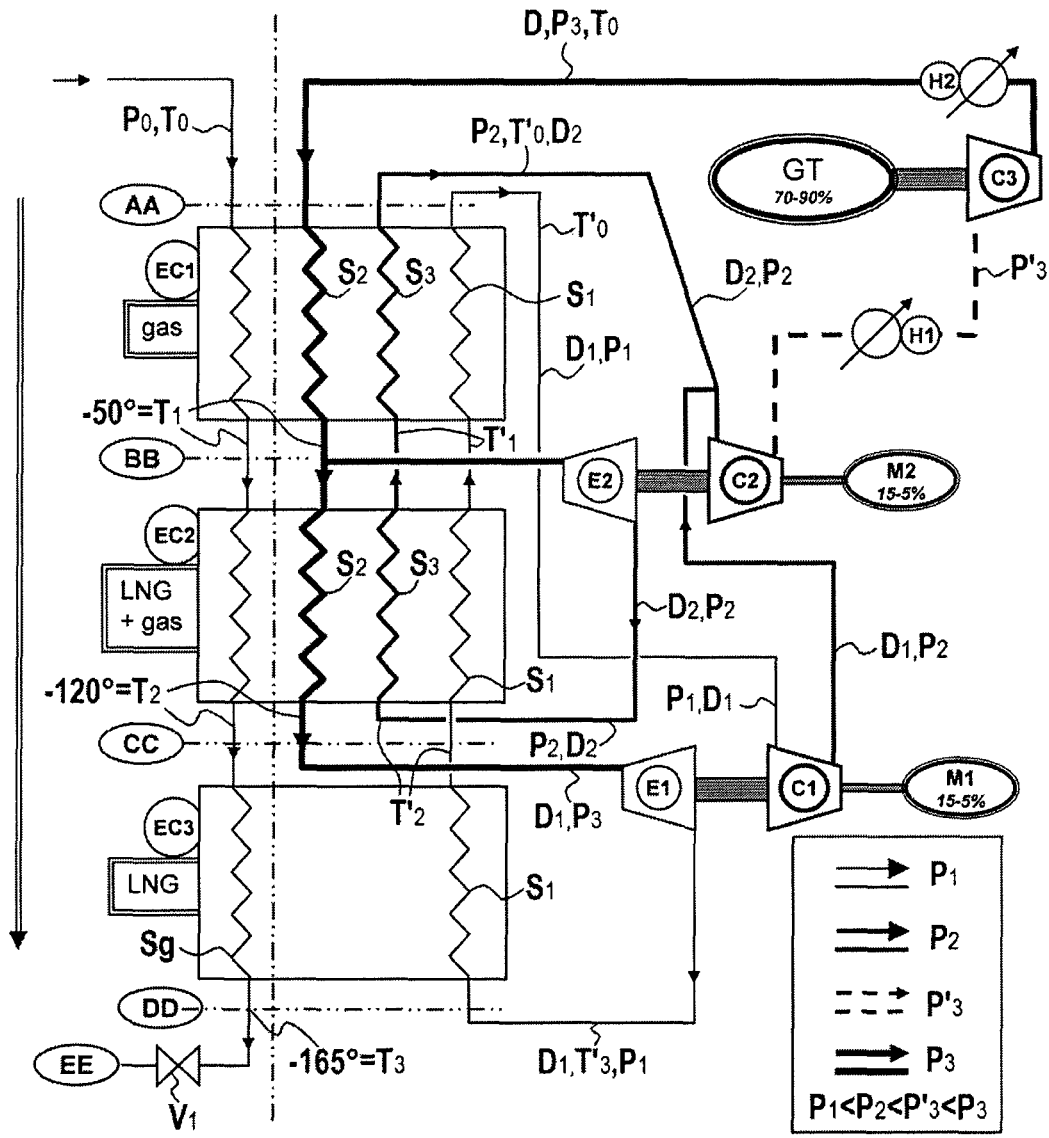
FIG. 2 is a diagram of a liquefaction process of the invention with a triple loop using nitrogen, or a mixture including nitrogen, as the refrigerant gas, in a version that is referred to as "balanced"
Figure 3:
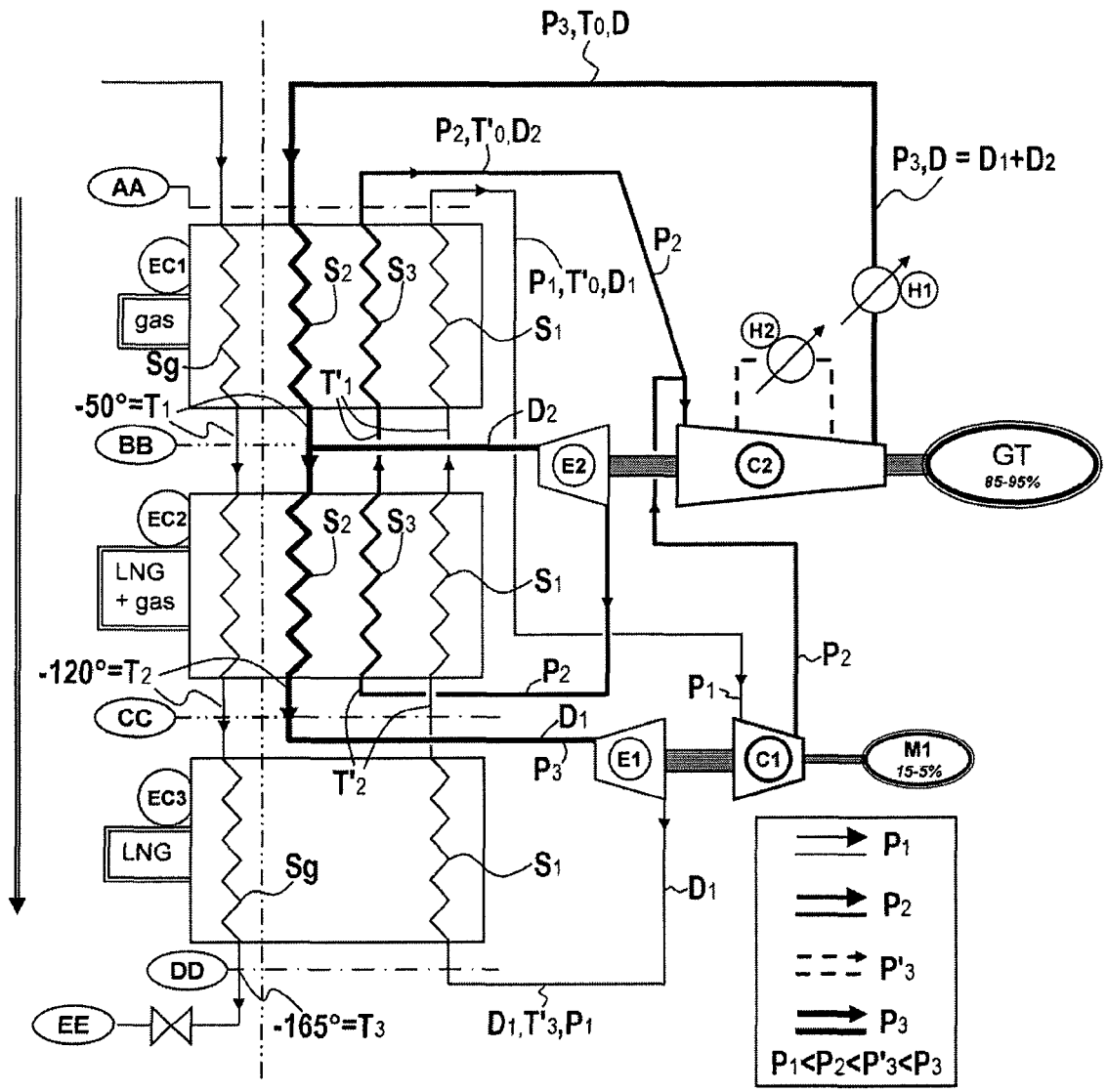
FIG. 3 is a diagram of a liquefaction process of the invention with a triple loop using nitrogen, or a mixture including nitrogen, as the refrigerant gas, in a version referred to as "compact"

FIGS. 2 and 3 are PFD diagrams for the improved process of the invention in which the path followed by the natural gas for liquefying, having a majority of methane and traces of other gases, is identical to that of FIG. 1 and takes place in the same manner within the circuit Sg, going from the top (temperature T0 substantially ambient temperature) towards the bottom (liquid state at T3=−165° C.), via three cryogenic heat exchangers EC1, EC2, and EC3.

In FIGS. 2 and 3, instead of expanding a portion D2 of the second stream at the outlet from the first heat exchanger and recycling it so that it rejoins the first stream at the low inlet CC of the second heat exchanger, as shown in FIG. 1, this portion D2 of the second stream is recycled to the inlet CC of the second heat exchanger, and this done at an intermediate pressure P2 that is higher than P1 in a third circuit S3 that is independent of S1, S2, and Sg, and that is parallel to S1, i.e. in which the flow is a cocurrent relative to S1.

Because the major portion of the energy is consumed in stage 2 of the process within said second heat exchanger, this makes it possible to further increase the transfers of heat and the overall energy efficiency of the process. However, and more importantly, this also makes it possible to modulate and control specifically the value of the pressure P2 by connecting the two compressors C1 and C2 in series and by coupling C1 with a motor M1 serving to modulate and control the additional power delivered to C1, which is already coupled to the turbine E1, thus making it possible to control the pressure value P2 as described below.

More precisely, FIGS. 2 and 3 show the process and the installation in which said natural gas for liquefying is liquefied by performing the following concurrent steps:

a) causing said natural gas for liquefying to flow Sg at a pressure P0 higher than or equal to atmospheric pressure (Patm), P0 being higher than atmospheric pressure, through three cryogenic heat exchangers EC1, EC2, EC3 connected in series and comprising:
- a first heat exchanger EC1 in which said natural gas entering at a temperature T0 is cooled and leaves at BB at a temperature T1 lower than T0, the temperature T1 being a temperature at which all of the components of the natural gas are still in the gaseous state; then
- a second heat exchanger EC2 in which the natural gas is liquefied in full and leaves at CC at a temperature T2 lower than T1; and
- a third heat exchanger EC3 in which said liquefied natural gas is cooled from T2 to T3, T3 being lower than T2, and T3 being lower than the liquefaction temperature of said natural gas at atmospheric pressure; and b) causing refrigerant gas in the gaseous state to flow in a closed circuit in two streams S1 and S3, referred to respectively as the first and third streams, having respective different pressures P1 (S1) and P2 (S2), the streams passing through two of said heat exchangers in indirect contact with and as a countercurrent to the natural gas stream Sg, the streams comprising:
- a first refrigerant gas stream S1 at a pressure P1 lower than P3 passing through all three heat exchangers EC1, EC2, and EC3, by entering said third heat exchanger EC3 at DD at a temperature T3' lower than T3, and then leaving said third heat exchanger and entering said second heat exchanger EC2 at CC at a temperature T2' lower than T2, then leaving the second heat exchanger and entering the first heat exchanger EC1 at BB at a temperature T1' lower than T1, and leaving said first heat exchanger at AA at a temperature T0' lower than T0, said first refrigerant gas stream at P1 and T3' being obtained by using a first expander E1 to expand a first portion D1 of a second refrigerant gas stream S2 compressed to the pressure P3 higher than P2, said second stream S2 flowing in indirect contact with and as a cocurrent to said natural gas stream Sg entering said first heat exchanger EC1 at AA and substantially at P0, and leaving said second heat exchanger EC2 at CC and substantially at the temperature T2; and
- a third stream S3 at a pressure P2 higher than P1 and lower than P3 flowing in indirect contact with and as a cocurrent to said first stream, passing solely through said second and first heat exchangers EC2 and EC1, entering said second heat exchanger at CC substantially at a temperature T2' lower than T2 and leaving said first heat exchanger EC1 at AA substantially at a temperature T0', said third stream S3 of refrigerant gas at P2 and T2 being obtained by using a second expander E3 to expand a portion D2 of said second stream D2 of refrigerant gas leaving said first heat exchanger substantially at T1;

c) said second stream of refrigerant gas S2 compressed to the pressure P3 being obtained by compressing said first and third refrigerant gas streams leaving said first heat exchanger EC1 at AA and respectively at P1 and P2 by means of first and second compressors respectively C1 and C2 connected in series and coupled respectively to said first and second expanders E1 and E2, which are constituted by turbines; and d) after step a), the liquefied natural gas leaving said third heat exchanger at DD and at T3 is depressurized from the pressure P0 to atmospheric pressure, where appropriate.

More precisely, in FIG. 2, use is made of:
1) three compressors C1, C2, and C3 connected in series and comprising:
   i) a first compressor C1 coupled to said first expander E1, and compressing from P1 to P2 all of said first refrigerant gas stream leaving said first heat exchanger EC1 at AA;
   ii) a second compressor C2 coupled to said second expander E2 and compressing firstly said third refrigerant gas stream S3 leaving said first heat exchanger EC1 at P2 and secondly said first refrigerant gas stream compressed to P2 and leaving said first heat exchanger EC1 from the pressure P2 to P'3, where P'3 is higher than P2 and lower than or equal to P3; and
   iii) a third compressor C3 driven by a gas turbine GT to deliver the major portion of the energy and to compress from P'3 to P3 all of the first and third refrigerant gas streams compressed by the second compressor C2 so as to obtain said second refrigerant gas stream at P3 and T0 after cooling (H1, H2); and 2) said first compressor C1 is coupled to a first motor M1 serving to vary the pressure P2 in controlled manner by delivering power in controlled manner to said first compressor C1, said first motor M1 delivering at least 3%, and preferably 3% to 30%, of the total power delivered to all of said compressors C1, C2, and C3 that are in use, the gas turbine GT coupled to said third compressor C3 and the second motor M2 coupled to the second compressor C2 together delivering 97% to 70% of the total power delivered to all of said compressors C1, C2, and C3 that are in use.

The installation of FIG. 2 is thus made up of:
- a plurality of motors, generally a gas turbine GT that drives the compressor C3, and motors M1 and M2, e.g. electric motors or fuel-burning engines, such as gas turbines, that are connected respectively to the compressors C1 and C2;
- three compressors:
  C3, which compresses all of the refrigerant gas flow D;
  C2, which is coupled to the motor M2 and to the turbine E2 and which compresses all of the refrigerant gas flow D; and
  C1, which is coupled to the motor M1 and to the turbine E1, and which compresses the fraction D1 of the first refrigerant gas stream;
- two expanders, e.g. turbines:
  E2 coupled to the compressor C2 and to the motor M2; and
  E1 coupled to the compressor C1 and to the motor M1;
- a cryogenic heat exchanger made up of three portions or comprising three heat exchangers in series EC1, EC2, and EC3, corresponding respectively to the stages 1, 2, and 3 of the liquefaction and having four circuits, respectively Sg (natural gas) and S1, S2, and S3 (refrigerant gas);
- two coolers H1 and H2 situated respectively at the outlet from the main compressor C3 (H1) before the inlet to the circuit S2 of the cryogenic heat exchangers, and on the high pressure loop (H2).

The compressors C1 and C2 are connected in series:
C1 operates between the low pressure P1 and the medium pressure P2 on the fraction D1 of the refrigerant gas stream coming from the turbine E1 and flowing in the circuit S1 upwards through each of the three cryogenic heat exchangers EC3, EC2, EC1; and C2 operating between the medium pressure P2 and the high intermediate pressure P'3 on all of the flow D, made up of the fraction D1 of the stream coming from the compressor C1 and of the fraction D2 of the refrigerant gas stream coming from the turbine E2 flowing in the circuit S3 upwards through two of the cryogenic heat exchangers EC2 and EC1.

The entire refrigerant gas flow D leaving the compressor C2 is cooled in a cooler H1 prior to returning to the pressure P'3 in the compressor C3, which compressor is connected to a motor (GT) generally a gas turbine. Said gas turbine and the motor (M2) together delivering 70% to 97% of the total power Q to the refrigerant gas, with the balance of the power being delivered to the system via the motor M1, i.e. 30% to 3% of the total power Q.

At the outlet from the compressor C3, all of the refrigerant gas flow D is at the high pressure P3. The stream is then cooled in a cooler H2 prior to flowing in the circuit S2 downwards through two of the cryogenic heat exchangers EC1 and EC2.

The fraction D2 of the refrigerant gas stream is taken at BB from the outlet from the cryogenic heat exchanger EC1 and is directed to the inlet of the turbine E2, the balance, i.e. the fraction D1 of the refrigerant gas stream being taken at CC from the outlet from the cryogenic heat exchanger EC2 and being directed to the inlet of the turbine E1.

A cooler H2 operating at a pressure P'3 is installed within the compressor C3 between two compression stages, said cooler H2 handling all of the flow D.

In this process of the invention, the following relationships apply:

$$D1+D2=D$$

and preferably $D1/D2=\frac{1}{3}$ to $\frac{1}{20}$, and more preferably $\frac{1}{4}$ to $\frac{1}{10}$.

The main advantage of the device of the invention as shown in FIG. 2 lies in the possibility of optimizing the overall efficiency of installations and of modifying at will the operating points of the various loops corresponding to the circuits S1, S2, S3, i.e. minimizing energy consumption by increasing or decreasing the power injected into any one of the compressors C1, C2, C3, or by varying the distribution of the overall power Q injected into the system. These adjustments of the amount of power injected into the various compressors C1, C2, C3 have the effect of modifying the flow rates in the various loops, and thus of modifying the pressures P1, P2, and P3 and also the mass flow rates D, D1, and D2 in the various circuits S1, S2, S3, thereby giving great flexibility in optimizing the operating point of the installation and thus great facility and great speed when readjusting the process as a result of fluctuations in the composition of the natural gas for liquefying coming from underground reservoirs. These fluctuations can be large during the lifetime of the gas production field, which lifetime may be as long as 20 years to 30 years, or even more.

Thus, in the graph of FIG. 4 relating to a natural gas comprising 85% methane, with the balance being made up of nitrogen, ethane (C-2), propane (C-3), and butane (C-4), the curve 50 made up of triangles shows variations in enthalpy H of the fluids flowing in the circuits Sg and S2 of FIG. 2 as a function of the temperature of the natural gas and/or LNG for an ideal virtual process.

The curve 53 corresponds to the variation in the enthalpy H of the refrigerant fluid flowing in the circuits S1 and S3 of FIG. 2, and it thus represents the energy that is transferred during the liquefaction process to the circuits Sg and S2 of FIG. 2.

The area 52 lying between the two curves 50 and 53 represents the overall energy loss in the liquefaction process with reference to FIG. 2: it is therefore appropriate to seek to minimize this area in order to obtain the best efficiency.

During variations over time in the quantity of natural gas delivered by the gas field, and thus of its composition, the low point 54 of the curve 50 corresponding to P0 and T2 at the end of liquefying the LNG may vary by a few percent. In the conventional process of FIG. 1, the corresponding point 55 of the refrigerant gas circuit remains substantially stationary, so the area 52 and thus the efficiency of the installation cannot be optimized.

In contrast, in the device of the invention as shown in FIG. 2, by acting on the distribution of mechanical energy, and in particular on the energy that is injected via GT, M1, and M2, and more particularly M1, it is advantageously possible to vary the position of the point 56, which point is thus caused to move in optimum manner closer to the point 54, thereby enabling the area 52 lying between the curves 50 and 53 to be minimized, and as a result acting in real time to optimize the efficiency of the liquefaction installation, as a function of the composition of the natural gas.

FIG. 3 is the PFD diagram of a version of the invention that is more compact than the processes and the installation of FIG. 2, in which the compressor C2 is incorporated on the same shaft line as the compressor C3 and is driven by the gas turbine GT that contributes 85% to 95% of the total energy Q in the form of mechanical energy. In this configuration, the expansion turbine E2 is connected firstly to the compressor C2 and secondly to the gas turbine GT.

In this version of FIG. 3 that is more compact than the version described with reference to FIG. 2, there is nevertheless reduced latitude for adjusting the operating points of the various loops, since power adjustments can then only be made via the motor GT connected to C3 and the motor M1 connected to C1. Thus, this compact version is advantageously preferred when the available area to the installation is very limited, and in addition it has only two rotary machine shaft lines and two compressors, whereas in the version described with reference to FIG. 2, it is necessary to install three rotary machine shaft lines and three compressors, which represents non-negligible extra cost, even though it provides greater flexibility in fine adjustment of the various pressure loops, and also better final efficiency, and thus better profitability for the installation over the long term, throughout the total lifetime of the installation, which may exceed 20 years to 30 years, or even more.

FIGS. 5 to 9 as described below reproduce the results of tests in which the values of P1, P2, and P3 were modified in order to minimize the total energy consumption Ef expressed in kW×d/t as a function of variations in the composition of the refrigerant gas.

Figure 5:
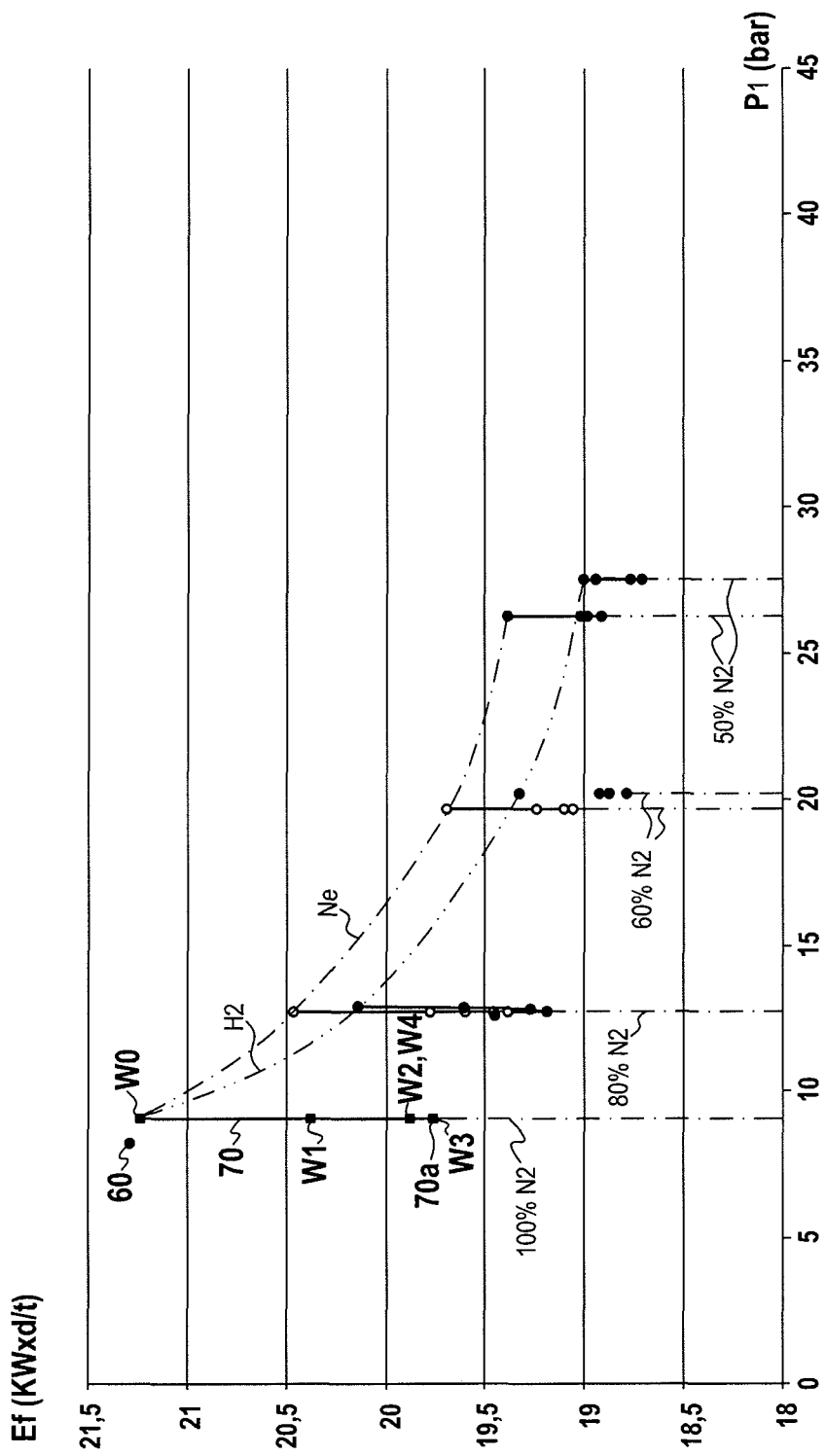
FIGS. 5 and 5A are graphs plotting total energy consumption (Ef) in kilowatt days per tonne of LNG produced (kW×d/t) for a liquefaction process of the invention using a mixture of nitrogen and neon as the refrigerant gas, as a function of the pressure P1 and of various percentages of neon in said mixture.
Figure 5A:
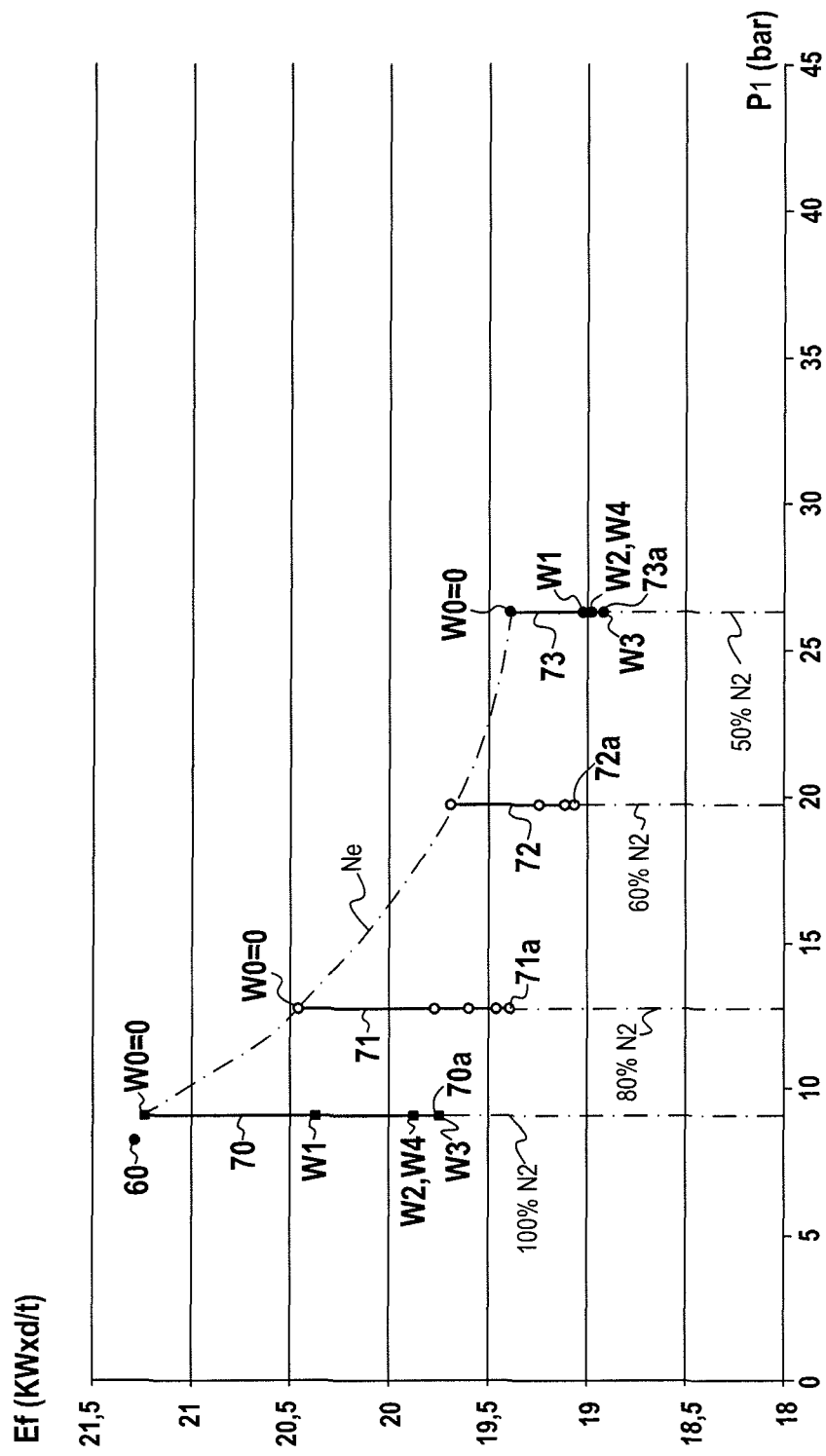
Figure 5B:
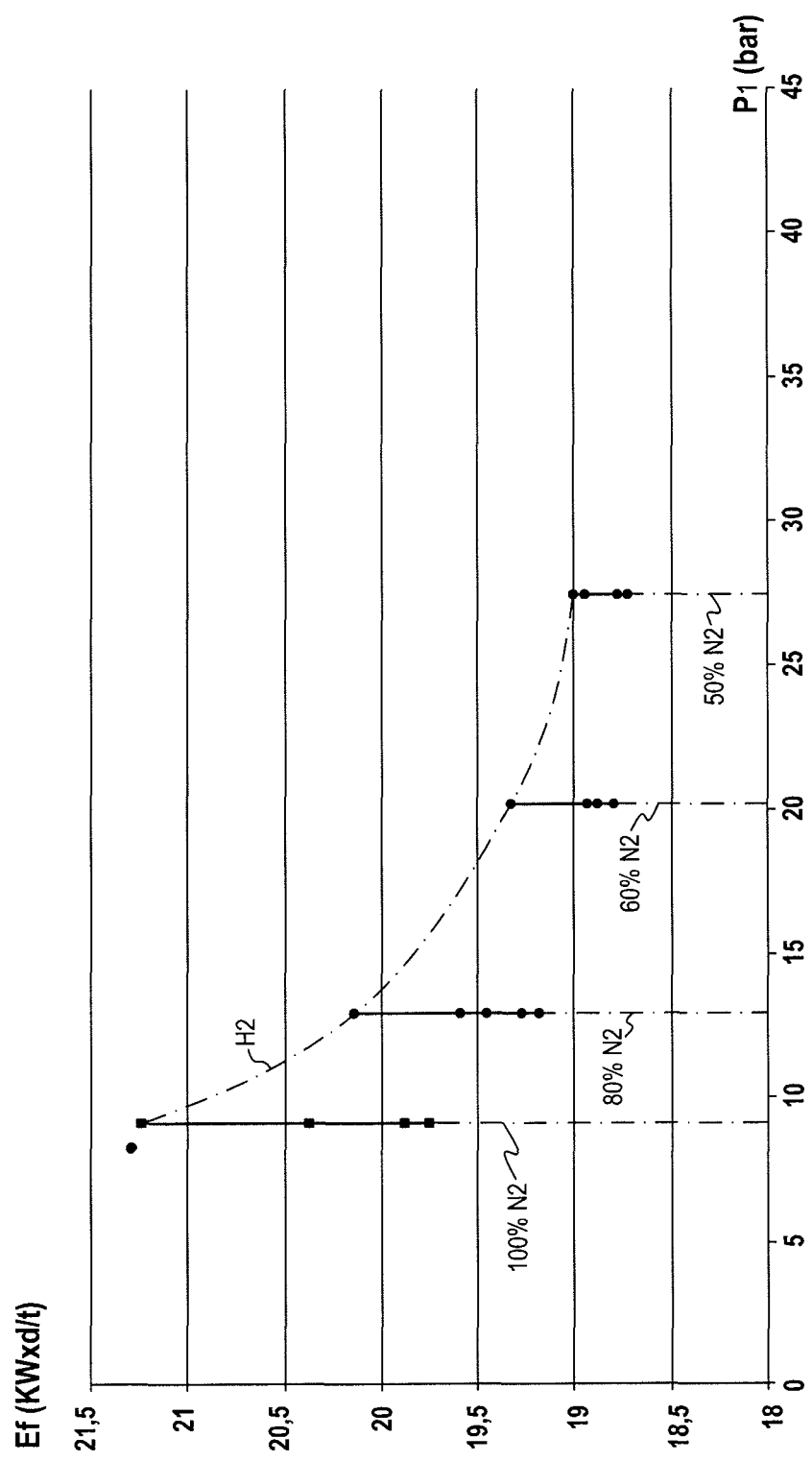

FIGS. 5, 5A, and 5B are energy efficiency diagrams, and more precisely they show Ef expressed in kW×d/t as a function of the pressure P1 and as a function of various variants of the invention. This pressure P1 is constant for a given refrigerant gas composition, which explains that all the points on any one curve lie on a straight line parallel to the ordinate axis. This pressure P1 corresponds to the lowest temperature T3' of the device, i.e. to the temperature at the low inlet to the cryogenic heat exchanger EC3. This pressure P1 corresponds to the dew point of the refrigerant gas at a temperature T3' substantially lower than T3=−165° C., i.e. the temperature at which the LNG remains liquid under a pressure corresponding to atmospheric pressure, i.e. substantially 0.1 MPa absolute, i.e. substantially one atmosphere.

In FIGS. 5, 5A, and 5B, it can be seen that by mixing the nitrogen with neon or with hydrogen, up to a molar proportion of 50%, it is possible to increase the pressure P1, which is accompanied by a decrease in the optimum energy consumption at the stabilized operating point, and thus by improved energy efficiency of the liquefaction process.

Furthermore, in FIG. 5A relating to a nitrogen-neon mixture, the operating point for the conventional process of FIG. 1 with pure nitrogen is situated at 60. The curve 70 (straight line portion) represents the variation in the energy efficiency as a function of the power injected into the process via the motor M1, with reference to FIGS. 2 and 3. The top point W0=0 of the curve 70 corresponds to an unpowered motor M1, i.e. a motor delivering no power. The point W1 corresponds to said motor M1 delivering a power W1>0. Likewise, successive points of the curve correspond to the motor M1 delivering increasing powers to the system, i.e. W4>W3>W2>W1>W0=0.

The points W0 to W4 correspond to the following powers being injected via the motor M1:
W0=zero power;
W1=7% of the total power;
W2=15% of the total power;
W3=24% of the total power; and
W4=33% of the total power.

In similar manner, the diagram of FIG. 6A shows the energy efficiency as a function of the pressure P2 and as a function of various variants of the invention. The curve 90 represents the process of FIG. 2 using a refrigerant gas made up of 100% nitrogen. As in FIG. 5A, the top point W0=0 of the curve 90 corresponds to a motor that is unpowered, and thus that delivers no power. The point W1 corresponds to said motor M1 delivering a power W1>0. Likewise, the following points of the curve correspond to the motor M1 delivering increasing powers to the system, such that W4>W3>W2>W1>W0=0: said powers W1 to W4 being identical in FIGS. 5A and 6A.

Thus, in this same FIG. 6A, it can be seen that when the power W injected via the motor M1 increases, the pressure P1 remains constant, but the pressure P2 increases and the efficiency increases, i.e. the energy consumption expressed in kW×d/t decreases, until it reaches a minimum 90a, which in this example coincides substantially with the point W3, after which said energy consumption increases once more towards W4. This minimum 90a corresponds to the low point 70a of the curve 70 in FIG. 5A, for minimum energy consumption of about 19.75 kW×d/t, a pressure P1 of about 9 bars, and a pressure P2 of about 28 bars. In comparison, the operating point W0 without energy being delivered via the motor M1 corresponds, in a pure nitrogen process, to energy consumption of about 21.25 kW×d/t, to the same pressure P1 of about 9 bars, and to a pressure P2 of about 11 bars: the energy efficiency is thus improved by 7.06%.

Figure 6B:
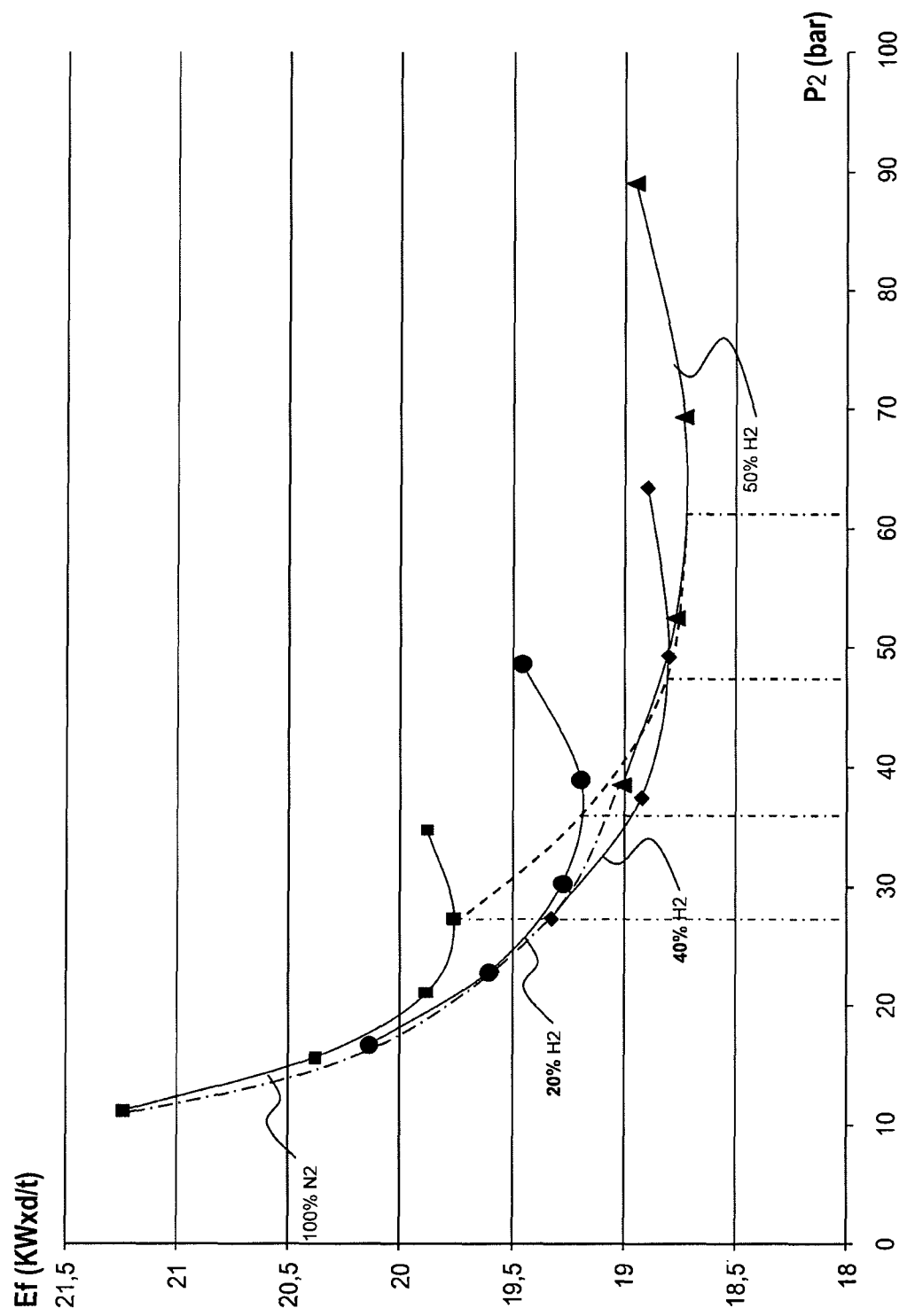
FIG. 6B is a graph plotting the total energy consumed (Ef) in kW×d/t of LNG produced by a liquefaction process of the invention using a mixture of nitrogen and hydrogen as the refrigerant gas, as a function of the pressure P2 and of various percentages of hydrogen in said mixture.
Figure 7:
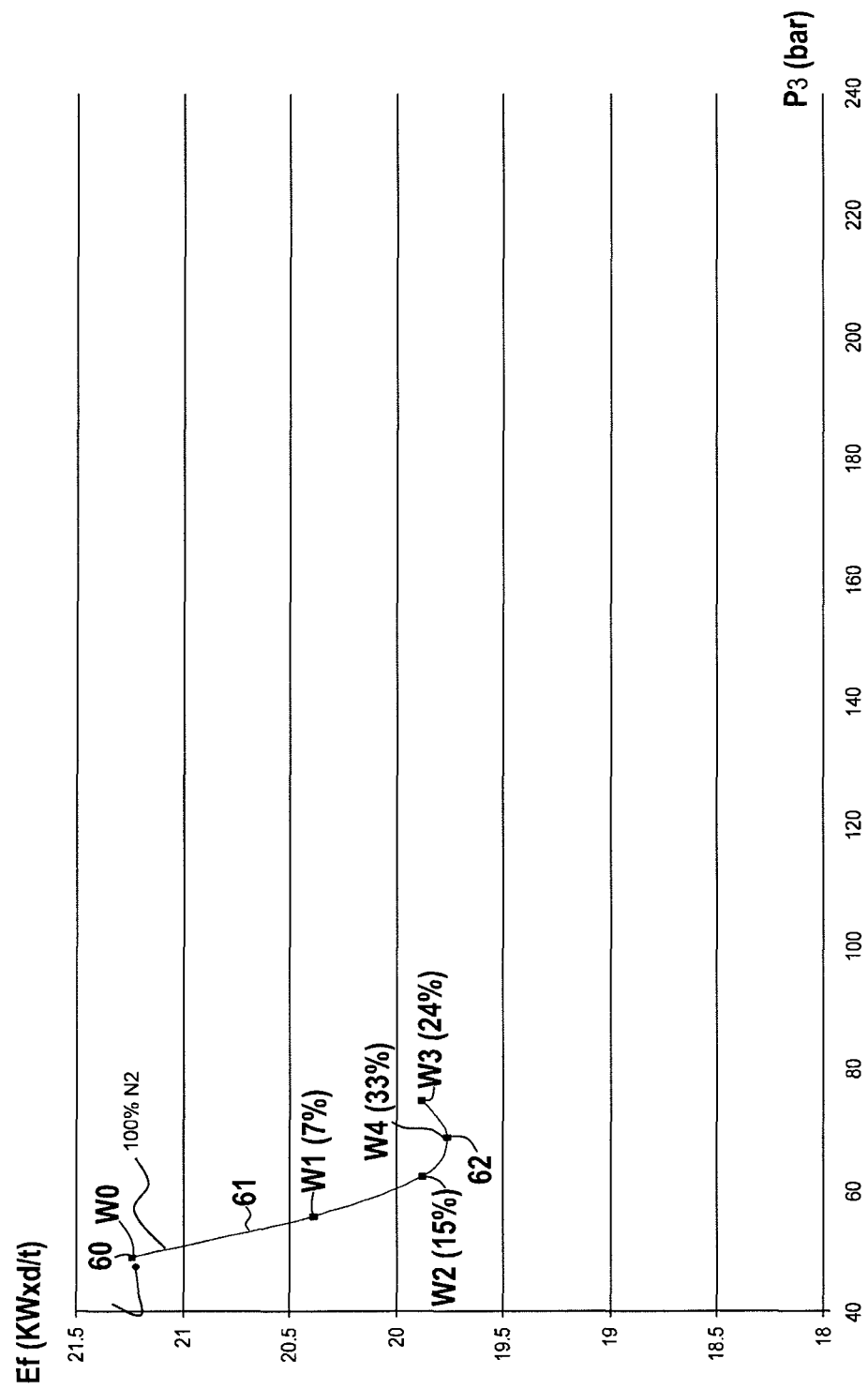
FIG. 7 is a graph plotting the total energy consumed (Ef) in kW×d/t of LNG produced in a liquefaction process of the prior art (60) and a liquefaction process of the invention, using nitrogen as the refrigerant gas and depending on the level of the pressure P3.
Figure 7A:
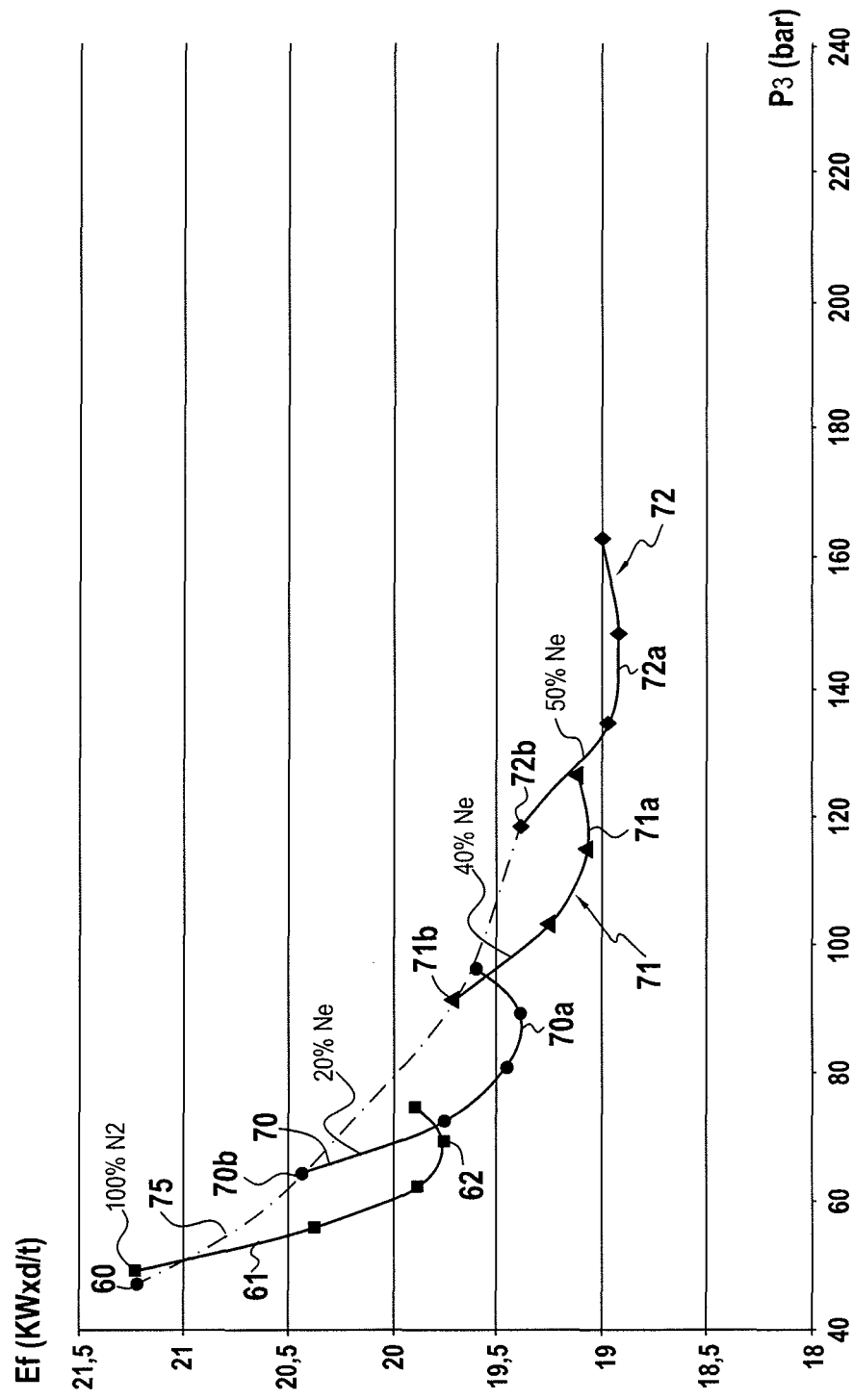
FIG. 7A is a graph plotting the total energy consumed (Ef) in kW×d/t of LNG produced by a liquefaction process of the invention using a mixture of nitrogen and neon as the refrigerant gas, as a function of the pressure P3 and of various percentages of neon in said mixture.

In similar manner in the diagram of FIG. 7A, there can be seen the energy efficiency as a function of the pressure P3 and as a function of various variants of the invention, in particular for a mixture of nitrogen and neon. The points W0, W1, W2, W3, W4 correspond to the motor M1 injecting the same levels of power as described above with reference to FIGS. 5A and 6A. P3 thus represents the maximum pressure of the system in the circuit S3: it increases in proportion to the power injected, and also to the percentage of neon in the refrigerant gas mixture.

Thus, an increase in the proportion of the power W injected via the motor M1 in FIGS. 2 and 3 compared with the total injected power:
has no influence on the pressure P1;
increases the pressure P2;
increases the maximum pressure P3; and
decreases energy consumption Ef down to a minimum value for a given proportion of power W, with the energy consumption then increasing once more beyond said proportion.

In the same way, the use of a nitrogen-neon mixture leads to an improvement in energy performance as shown in FIGS. 5A to 6A, both in conventional processes as described with reference to FIG. 1 and in processes as described with reference to FIGS. 2 and 3.

Thus, giving consideration to a mixture having 20% neon, the pressure P1 is about 12.5 bars and curve 71 in FIG. 5A shows the variations in energy consumption for the same increasing powers delivered to the system via the motor M3 (W4>W3>W2>W1>W0=0).

For this same neon percentage of 20%, curve 91 of FIG. 6A shows the variations in energy consumption for the motor M1 delivering the same increasing powers to the system (W4>W3>W2>W1>W0=0), as a function of the power P2. It can thus be seen that when the power W injected via M1 is increased, efficiency increases, i.e. energy consumption expressing kW×d/t decreases down to a minimum 91a, situated between the points W2 and W3 of said curve 91, after which said energy consumption increases once more towards W4. This minimum corresponds to the low point 71a of the curve 71 in FIG. 5A for a minimum energy consumption of about 19.4 kW×d/t, a pressure P1 of about 12.5 bars, and a pressure P2 of about 33 bars. In comparison, the operating point W0 of the same curve 91 corresponding to a 20% neon mixture without energy being delivered via the motor M1 corresponds to an energy consumption of about 20.45 kW×d/t, to the same pressure P1 of about 12.5 bars, and to a pressure P2 of about 17 bars, thus illustrating the improvement in energy efficiency when combining the increase in the percentage of neon and the increase in the power injected via the motor M1.

The same effects are observed using hydrogen, as can be seen in FIGS. 5B and 6B.

In FIGS. 5 to 7, there can be seen performance diagrams for a conventional process and for a process of the invention for liquefying a natural gas comprising 85% methane and 15% of said other constituents.

In the diagram of FIG. 7A, the maximum pressure P3 is plotted along the abscissa and the energy per unit mass of gas is plotted up the ordinate. Energy is plotted in units of kW×d/t of natural gas (1 kW×d/t=0.024 kWh/kg). Thus, for a refrigerant gas constituted by 100% nitrogen, the operating point of the conventional process with reference to FIG. 1 is situated at 60 in FIG. 7A. In contrast, in the process of the invention as described with reference to FIGS. 2 and 3, for various compositions of the nitrogen-neon mixture, while injecting power via the motor M1, it is possible to vary the efficiency of the installation in accordance with curve 70 (20% neon) and with other curves (40% or 50% neon). Thus, from an operating point at 45 bars to 50 bars using the conventional process, corresponding to energy consumption of about 21.3 kW×d/t, it is possible to increase the thermodynamic efficiency by increasing the maximum pressure. Thus, as shown in this same diagram, for a refrigerant gas constituted by 100% pure nitrogen, while injecting a portion of the power via the motor M1, and while operating at a pressure of about 68 bars, the energy consumption drops to about 19.75 kW×d/t, which represents an increase in efficiency of 7.28%.

In general, by operating at higher pressure, for a given mass flow rate, the volume flow rates are reduced prorata the increase in said pressure: the pipes are thus of smaller diameter, while their mechanical strength and thus their thickness, their weight, and their cost need to be increased accordingly: in contrast, the footprint is also reduced accordingly, which is most advantageous for installations in a confined environment, such as on a floating support anchored at sea, or indeed on a methane tanker for a unit for reliquefying boil-off. In the same manner, compressors and turbines operating at higher pressures are much more compact. For the cryogenic heat exchangers, an increase in pressure also improves heat transfer, but the heat exchange areas are not reduced by as much as for the pipes and the compressors and the turbines. In contrast, their weight increases significantly because they need to be able to withstand this increase in pressure.

Thus, overall, the process of the invention as shown in FIGS. 2 and 3 leads to installations that are more compact and to a significant improvement in energy efficiency when the refrigerant is pure nitrogen, which energy efficiency is further improved when the refrigerant gas is a mixture of nitrogen and either neon or hydrogen.

FIG. 7A is a performance diagram for a conventional process as described with reference to FIG. 1 and for the process of the invention as described with references to FIGS. 2 and 3, using a mixture of nitrogen and neon as the refrigerant gas, in which the maximum pressure P3 is plotted along the abscissa and energy per unit mass of gas is plotted up the ordinate. Energy is plotted in units of kW×d/t of natural gas.

Thus, for a given gas composition, the operating point of the conventional process described with reference to FIG. 1 is situated at 60 in FIG. 7A. In the process of the invention, as described with reference to FIGS. 2 and 3, and using a refrigerant gas made up of 100% nitrogen, while injecting power via the motor M1, it is possible to vary the efficiency of the installation along curve 61 with an optimum operating point 62 at about 68 bars, corresponding to an energy consumption of about 19.75 kW×d/t, which represents an improvement in efficiency of 7.28% compared with the operating point 60 of the conventional process.

By using a mixture of 80% nitrogen and 20% neon as the refrigerant gas, it is possible to increase pressure, as shown by curve 70, without the gas mixture reaching its dew point up to an optimum value 70a of about 88 bars and for an energy consumption of about 19.4 kW×d/t, which represents a thermodynamic efficiency improvement of 1.77% compared with the operating point 62 of the process of the invention with a refrigerant gas made up of 100% nitrogen and a thermodynamic efficiency improvement of 8.92% compared with the operating point 60 of the conventional process.

By using a 60% nitrogen and 40% neon mixture as the refrigerant gas, it is possible to increase pressure as shown by curve 71 without the gas mixture reaching its dew point up to an optimum value 71a of about 118 bars, together with minimum energy consumption of about 19.15 kW×d/t, which represents a thermodynamic efficiency improvement of 3.04% compared with the operating point 62 of the process of the invention with a refrigerant gas made up of 100% nitrogen, and a thermodynamic efficiency improvement of 10.09% compared with the operating point 60 of the conventional process.

By using a mixture of 50% nitrogen and 50% neon as the refrigerant gas, it is possible to increase the pressure, as shown by curve 72, without the gas mixture reaching its dew point, up to an optimum value 72a of about 145 bars in association with minimum energy consumption of about 18.8 kW×d/t, which represents a thermodynamic efficiency improvement of 4.81% compared with the operating point 62 of the process of the invention with a refrigerant gas made up of 100% nitrogen, and a thermodynamic efficiency improvement of 11.74% relating to the operating point 60 of the conventional process.

Figure 7B:
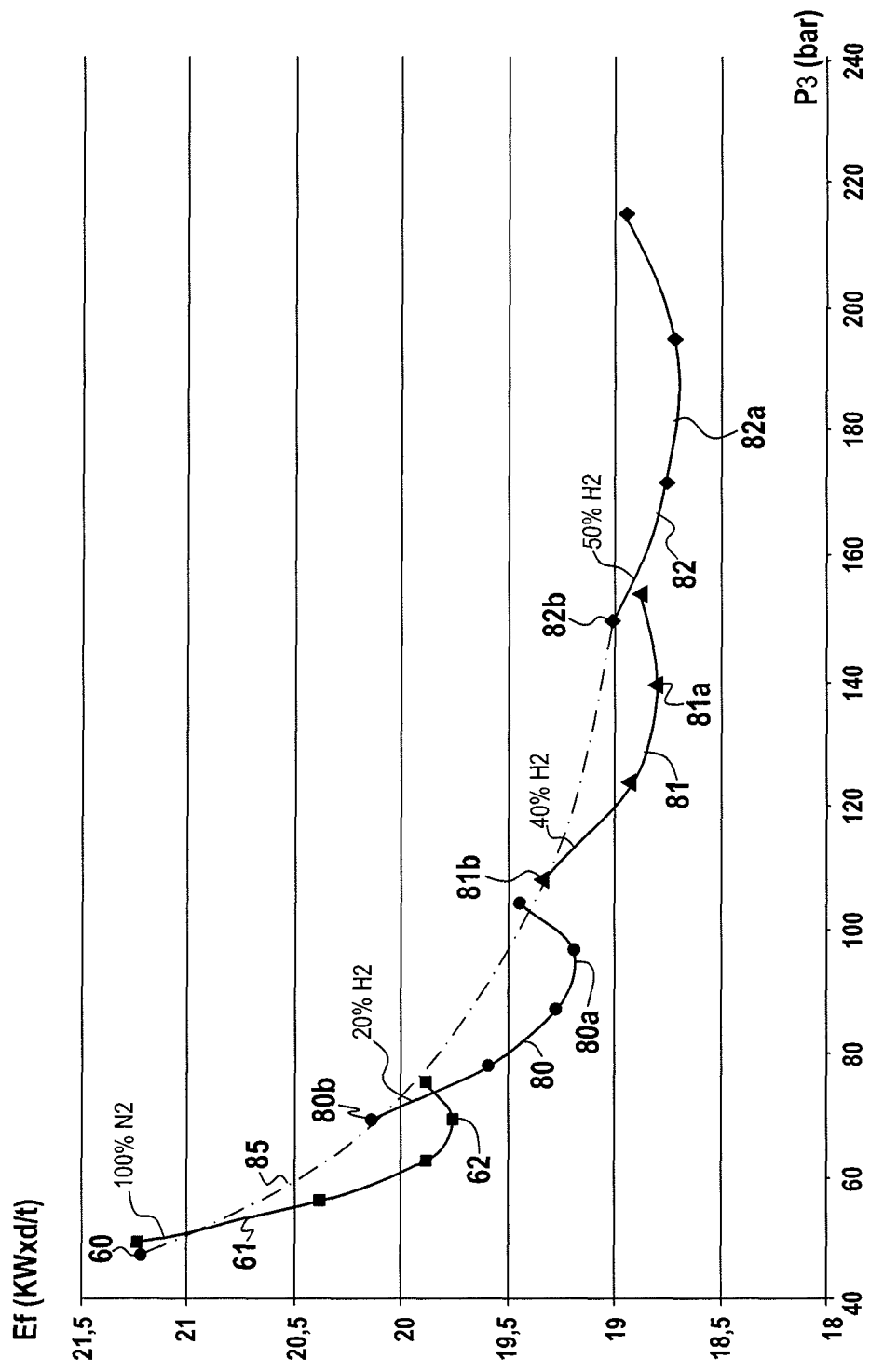
FIG. 7B is a graph plotting the total energy consumed (Ef) in kW×d/t of LNG produced by a liquefaction process of the invention using a mixture of nitrogen and hydrogen as the refrigerant gas, as a function of the pressure P3 and of various percentages of hydrogen in said mixture.

In the same manner, as shown in the diagram of FIG. 7B, it is advantageous to use as the refrigerant gas a mixture of nitrogen and hydrogen.

Thus, by using a mixture of 80% nitrogen and 20% hydrogen as the refrigerant gas, it is possible to increase the pressure as shown by curve 80 without the gas mixture reaching its dew point up to an optimum value 80a of about 94 bars associated with minimum energy consumption of about 19.2 kW×d/t, which represents a thermodynamic efficiency improvement of 2.78% compared with the operating point 62 of the process of the invention of FIGS. 2 and 3 using a refrigerant gas made up of 100% nitrogen, and a thermodynamic efficiency improvement of 9.86% relative to the operating point 60 of the conventional process of FIG. 1.

By using a 60% nitrogen and 40% hydrogen mixture as the refrigerant gas, it is possible to increase the pressure, as shown by curve 81, and without the gas mixture reaching its dew point, up to an optimum value 81a of about 140 bars in association with minimum energy consumption of about 18.8 kW×d/t, which represents a thermodynamic efficiency improvement of 4.81% compared with the operating point 62 of the process of the invention as shown in FIGS. 2 and 3 when using a refrigerant gas made up of 100% nitrogen, and a thermodynamic efficiency improvement of 11.74% relative to the operating point 60 of the conventional process of FIG. 1.

As shown by curve 82, by using a mixture of 50% nitrogen and 50% hydrogen as the refrigerant gas, it is possible to increase the pressure without the gas mixture reaching its dew point up to an optimum value 82a of about 186 bars, in association with minimum energy consumption of about 18.7 kW×d/t, which represents a thermodynamic efficiency improvement of 5.32% compared with the operating point 62 of the process of the invention of FIGS. 2 and 3 using a refrigerant gas made up of 100% nitrogen, and a thermodynamic efficiency improvement of 12.21% relative to the operating point 60 of the conventional process of FIG. 1.

Thus, for an increasing percentage of the additional gas, whether hydrogen or neon, that is added to nitrogen in order to make up the refrigerant gas, the thermodynamic efficiency of the process is significantly improved, while allowing operation at higher pressure, which implies equipment that is more compact, which in itself is most advantageous when only very small areas are available, as applies to a floating support anchored at sea or on board a methane tanker when applied to reliquefaction units.

The process of the invention uses either a mixture of nitrogen and neon or of nitrogen and hydrogen, and in spite of its slightly lower efficiency, it is preferred to use the nitrogen and neon mixture, since neon is an inert gas, whereas hydrogen is combustible and remains dangerous and difficult to use, in particular at high pressure in confined installations on board a floating support. In addition, hydrogen is a gas that percolates very easily through elastomer gaskets and even under certain circumstances through metals, particularly at very high pressure, and as a result the process of the invention based on the use of a nitrogen-hydrogen mixture does not constitute the preferred version of the invention: the preferred version of the invention remains using a mixture of nitrogen and neon as the refrigerant gas in the devices described above with reference to the various figures.

In the same manner, the efficiency of conventional processes using nitrogen as the refrigerant gas can be improved by giving consideration to a binary mixture of nitrogen and neon or of nitrogen and hydrogen.

Thus, as shown in the diagram of FIG. 7A, curve 75 shows variation in the efficiency of a conventional process as described with reference to FIG. 1 or one of its variants, as a function of the percentage of neon gas in the refrigerant gas. For neon present at 20%, the operating point is situated at 70b, which corresponds to a maximum pressure P3 of about 63 bars and to an energy consumption of about 20.45 kW×d/t, which represents a thermodynamic efficiency improvement of 3.76% compared with the operating point 60 of the same conventional process using a refrigerant gas made up of 100% nitrogen.

With a 40% neon content, the operating point is situated at 71b, which corresponds to a maximum pressure P3 of about 90 bars and to energy consumption of about 19.70 kW×d/t, which represents a thermodynamic efficiency improvement of 7.29% compared with the operating point 60 of the process conventional process with a refrigerant gas made up of 100% nitrogen.

For a 50% neon content, the operating point is situated at 72b, which corresponds to a maximum pressure P3 of about 120 bars and to an energy consumption of about 19.35 kW×d/t, which represents a thermodynamic efficiency improvement of 8.94% compared with the operating point 60 of the same conventional process using a refrigerant gas made up of 100% nitrogen.

In the same manner, with a nitrogen-hydrogen mixture having 20% hydrogen, as shown in FIG. 7B, the operating point is situated at 80b, which corresponds to a maximum pressure P3 of about 68 bars and to an energy consumption of about 20.2 kW×d/t, which represents a thermodynamic efficiency improvement of 4.94% compared with the operating point 60 of the same conventional process with a refrigerant gas made up of 100% nitrogen.

For a 40% hydrogen content, the operating point is situated at 81b, which corresponds to a maximum pressure P3 of about 108 bars and to energy consumption of about 19.8 kW×d/t, which represents a thermodynamic efficiency improvement of 6.82% compared with the operating point 60 of the same conventional process with a refrigerant gas made up of 100% nitrogen.

With a 50% hydrogen content, the operating point is situated at 82b, which represents a maximum pressure P3 of about 150 bars and an energy consumption of about 19 kW×d/t, which represents a thermodynamic efficiency improvement of 10.59% compared with the operating point 60 of the same conventional process with a refrigerant gas made up of 100% nitrogen.

By way of example, a conventional liquefaction unit is dimensioned with reference to the powers of available gas turbines, and high power turbines commonly deliver 25 MW.

In general, it is desired to increase the power of the installation so it is possible to install two identical gas turbines (GT1 and GT2) in parallel in order to obtain 30 MW (2×15 MW) or indeed 40 MW (2×20 MW), however there are then two rotary machine lines which increases overall bulk, the amount of pipework, and naturally costs.

By using a single 25 MW gas turbine GT at C3 as in FIG. 2 and by adding power via the second motor M2, e.g. at 5 MW, in order to obtain a total of 30 MW, or of 15 MW in order to obtain a total of 40 MW, the operation of the process as described with reference to FIG. 2 is identical in terms of efficiency to that of the process using two gas turbines (GT1 and GT2) in parallel.

Thus, giving consideration to a 25 MW gas turbine GT, and adding 5 MW via the motor (M2), preferably using an electric motor, gives greater flexibility in operation and thus makes it possible to increase power by 20%. In contrast, the overall efficiency remains unchanged being substantially 21.25 kW×d/t of LNG produced, as shown in the diagram of FIG. 7 at point 60.

In contrast, if the same power of 5 MW is delivered via the first motor M1, the overall power is still 30 MW, but the overall efficiency is then improved, substantially reaching the value of 19.8 kW×d/t of LNG produced, which represents an improvement of 6.59% for the same overall power of 30 MW, compared with injecting a power of 5 MW via the second motor M2, as described above. Said additional 5 MW of power via the first motor M1 then represents 16.6% of the overall power and said efficiency (19.8 kW×d/t) corresponds substantially to the point W2 in the diagram of FIG. 7.

In the same manner for the embodiment of FIG. 3, by using a single 25 MW gas turbine GT at C2 as shown in FIG. 3 and by adding power via the turbine GT, e.g. MW in order to obtain a total of 30 MW, or 10 MW in order to obtain a total of 40 MW, the operation of the process described with reference to FIG. 2 is identical in terms of efficiency to that of the process using two gas turbines (GT1 and GT2) in parallel.

Thus, in consideration of a 25 MW gas turbine GT, adding 5 MW of power via the turbine GT gives greater flexibility in operation and thus enables power to be increased by 20%. In contrast, the efficiency of the assembly remains unchanged, being substantially 21.25 kW×d/t of LNG produced, as shown in the diagram of FIG. 7 at point 60.

In contrast, if the same power of 5 MW is delivered via the first motor M1, the overall power is still 30 MW, but the overall efficiency is then improved and reaches a value of substantially 19.8 kW×d/t of LNG produced, which represents an improvement of 6.59% for the same overall power of 30 MW, compared with injecting power, of 5 MW via the second motor M2 as described above. Said additional 5 MW of power added via the first motor M1 then represents 16.6% of the overall power and said efficiency (19.8 kW×d/t) corresponds substantially to the point W2 in the diagram of FIG. 7.

Thus, as a function of the quantities and the qualities of the natural gas produced from underground reservoirs, it is advantageous to use a gas turbine GT, e.g. a 25 MW turbine, that operates continuously at full power:

with additional power being added by being injected via the turbine GT (FIG. 2) or via the second motor M2 (FIG. 3) without changing the overall efficiency (point W0 in FIG. 7); and with constant or variable additional power being injected via the first motor M1 having the effect of improving the overall efficiency as shown by curve 61 in the same FIG. 7, up to an optimum, i.e. a minimum energy consumption of 19.75 kW×d/t corresponding substantially to the point W3 of said curve 61: the energy injected via said first motor M1 then represents substantially 24% of the total energy in this situation.

In general, a gas turbine GT will be used at full power, and additional power will be delivered via the first motor M1, said additional power being limited to about 24% of the overall power so as to optimize the efficiency on the minimum value of 19.75 kW×d/t, and then, where necessary, the overall power will be increased by injecting power via the second motor M2 and concurrently readjusting the power injected via the first motor M1 so that the power it injects is still substantially equal to about 24% of the total power so as to conserve the efficiency of the installation on the optimum value of 19.75 kW×d/t.

Said optimum efficiency of 19.75 kW×d/t for power from the first motor M1 representing 24% of the total power is valid for a refrigerant fluid constituted by 100% nitrogen. When using a nitrogen-neon or nitrogen-hydrogen mixture, the optimum efficiency, and thus also the power percentage vary as a function of the mixtures and of their percentages of neon or hydrogen, but the advantages described in detail above remain valid and are even cumulative.

The invention is described above with a mixture constituted essentially of nitrogen and either neon or hydrogen, since helium has not been found to be particularly advantageous in the process.

Nevertheless, traces of other gases in small quantities, together not exceeding 0.5% to 1%, for example, do not disturb the process nor do they disturb its overall efficiency, since they liquefy at the low points of the cold zones where they remain confined, unless they are entrained by the speed of the refrigerant gas. The only real danger would come from liquid droplets coming into contact with the blades of compressors or turbines rotating at high speed, but that is easily avoided by arranging the low points at suitable locations and advantageously fitting them with means for purging to the atmosphere. Such purge means thus make it possible to eliminate undesired residual gases quickly and thus to ensure, within a few hours or possibly a few days of operation, that the refrigerant gas mixture is genuinely a binary mixture.

The invention claimed is:

1. A process for liquefying natural gas comprising a majority of methane, with other components essentially comprising nitrogen and C-2 to C-4 alkanes, the process comprising: liquefying said natural gas by causing said natural gas to flow at a pressure P0 higher than or equal to atmospheric pressure (Patm), through at least one cryogenic heat exchanger (EC1, EC2, EC3) by flowing as a countercurrent in indirect contact with at least one stream of refrigerant gas that remains in a gaseous state and that is compressed to a pressure P1 entering said cryogenic heat exchanger at a temperature T3' lower than T3, wherein T3 is the liquefaction temperature of said liquefied natural gas on leaving said cryogenic heat exchanger, T3 being lower than or equal to the liquefaction temperature of said liquefied natural gas at atmospheric pressure, said refrigerant gas flowing in a closed circuit, wherein said refrigerant gas consists essentially of a mixture of nitrogen and at least one other constituent selected from neon and hydrogen.

2. The method according to claim 1, wherein said refrigerant gas consists of a binary mixture of nitrogen and neon.

3. The method according to claim 1, wherein said refrigerant gas consists essentially of a mixture of nitrogen and said other constituent(s) at a molar content for said other constituent(s) of not more than 40%.

4. The method according to claim 1, wherein said natural gas for liquefying is liquefied by performing the following concurrent steps:
a) causing said natural gas for liquefying to flow (Sg) at the pressure P0 higher than or equal to atmospheric pressure (Patm), through at least three cryogenic heat exchangers (EC1, EC2, EC3) connected in series and including:
a first heat exchanger (EC1) in which said natural gas enters at a temperature T0 and is cooled and leaves (BB) at a temperature T1 lower than T0; then
a second heat exchanger (EC2) in which said natural gas is liquefied in full and leaves (CC) at a temperature T2 lower than T1 and higher than T3; and
a third heat exchanger (EC3) in which said liquefied natural gas is cooled from T2 to T3; and
b) causing at least one first stream (S1) of refrigerant gas in the gaseous state to flow in a closed circuit as a countercurrent at the pressure P1 lower than P3 in indirect contact with and as a countercurrent to the stream of natural gas (Sg), said first stream (S1) at the pressure P1 passing through the three heat exchangers (EC1, EC2, EC3), entering (DD) into said third heat exchanger (EC3) at the temperature T3' lower than T3, then entering (CC) at a temperature T2' lower than T2 into said second heat exchanger (EC2), then entering (BB) at a temperature T1' lower than T1 into said first heat exchanger (EC1) and leaving (AA) said first heat exchanger (EC1) at a temperature T0' lower than or equal to T0;
said first stream (S1) of refrigerant gas at P1 and T3' being obtained by using at least a first expander (E1) to expand at least a first portion (D1) of at least a second stream (S2) of refrigerant gas compressed to P3 higher than P1 and flowing as a cocurrent with said natural gas, entering (AA) into said first heat exchanger (EC1) at T0 and leaving (CC) said second heat exchanger (EC2) substantially at T2, said second stream (S2) having a second portion (D2) with a flow rate of said second portion of the second stream being greater than the flow rate of the first portion (D1) of the second stream; and
said second portion (D2) of said second stream (S2) compressed to P3 flowing as a cocurrent to said natural gas, entering (AA) into said first heat exchanger (EC1) at T0 and leaving said first heat exchanger at substantially T1 is expanded in a second expander (E2) to said pressure P1 and to said temperature T2', and is recycled to rejoin said first stream at the inlet (CC) of said second heat exchanger; and
c) said second stream (S2) compressed to P3 being obtained by using at least one compressor (C1, C2, C3) to compress said first stream (S1) of recycled refrigerant gas leaving (AA) said first heat exchanger (EC1), followed by at least one cooling operation (H1, H2), and
d) after step a), depressurizing the liquefied natural gas from the pressure P0 to atmospheric pressure.

5. The method according to claim 4, wherein three compressors are used including a first compressor and a second compressor connected in parallel and comprising:
a third compressor (C3) actuated by a motor, to compress all of said first refrigerant gas stream coming from the outlet (AA) of said first heat exchanger (EC1) to P'3, where P'3 lies in the range from P1 to P3; and the first compressor (C1) coupled to the first expander (E1) consisting in a turbine to compress from P'3 to P3 a portion (D1') of said first refrigerant gas stream as compressed by the third compressor (C3); and the second compressor (C2) coupled to the second expander (E2) consisting in a turbine in order to compress from P'3 to P3 a portion (D2') of said first refrigerant gas stream as compressed by the third compressor (C3).

6. The method according to claim 1, wherein said liquid natural gas for liquefying is liquefied by performing the following concurrent steps:

a) causing said natural gas for liquefying to flow (Sg) at the pressure P0 higher than or equal to atmospheric pressure (Patm), P0 being higher than atmospheric pressure, through at least three cryogenic heat exchangers (EC1, EC2, EC3) connected in series and comprising:

a first heat exchanger (EC1) in which said natural gas entering at a temperature T0 is cooled and leaves (BB) at a temperature T1 lower than T0; then a second heat exchanger (EC2) in which the natural gas is fully liquefied and leaves (CC) at a temperature T2 lower than T1 and higher than T3; and a third heat exchanger (EC3) in which said liquefied natural gas is cooled from T2 to T3;

b) causing at least two streams (S1, S3) of refrigerant gas in the gaseous state and referred to respectively as a first and a third stream to circulate in closed circuits at different pressures P1 and P2 passing through at least two of said heat exchangers in indirect contact with and as a countercurrent relative to the natural gas stream (Sg) and comprising:

the first stream of refrigerant gas (S1) at the pressure P1 lower than P3 passing through the three heat exchangers (EC1, EC2, EC3) entering (DD) into said third heat exchanger (EC3) at the temperature T3' lower than T3, then entering (CC) at a temperature T2' lower than T2 into said second heat exchanger (EC2), then entering (BB) at a temperature T1' lower than T1 into said first heat exchanger (EC1) and leaving (AA) said first heat exchanger at a temperature T0' lower than or equal to T0, said first stream of refrigerant gas at P1 and T3' being obtained by using a first expander (E1) to expand a first portion (D1) of a second stream (S2) of refrigerant gas compressed to the pressure P3 higher than P2, said second stream (S2) circulating in indirect contact with and as a cocurrent relative to said natural gas stream (Sg) by entering (AA) into said first heat exchanger (EC1) at T0 and said first portion (D1) of the second stream leaving (CC) said second heat exchanger (EC2) substantially at T2; and the third stream (S3) at a pressure P2 higher than P1 and lower than P3 circulating in indirect contact with and as a cocurrent relative to said first stream, passing solely through said second and first heat exchangers (EC2, EC1), entering (CC) into said second heat exchanger at the temperature T2' lower than T2 and leaving (AA) said first heat exchanger (EC1) at T0' lower than or equal to T0, said third stream (S3) of refrigerant gas at P2 and T2 being obtained by using a second expander (E2) to expand a second portion (D2) of said second stream (S2) of refrigerant gas leaving said first heat exchanger substantially at T1, the flow rate D2 of said second portion of the second stream being greater than the flow rate D1 of the first portion of the second stream;

c) said second stream of refrigerant gas (S2) compressed to the pressure P3 being obtained by using at least two compressors (C1, C2, C3) and by cooling (H1, H2), to compress said first and third streams (S1, S3) of refrigerant gas leaving (AA) said first heat exchanger (EC1) at P1 and P2 respectively, by at least first and second compressors (C1, C2) connected in series and respectively coupled to said first and second expanders (E1, E2) consisting of turbines; and d) after step a), depressurizing the liquid natural gas leaving (DD) said third heat exchanger at T3 from the pressure P0 to atmospheric pressure.

7. The method according to claim 6, wherein said pressure P2 is caused to vary in a controlled manner so that energy (Ef) consumed for performing the method is minimized, when the composition of the natural gas for liquefying varies.

8. The method according to claim 6, wherein with at least one of the compressors (C1) is coupled to a first motor (M1) enabling the pressure P2 to be varied in a controlled manner by delivering power in a controlled manner to said at least one of the compressors.

9. The method according to claim 6, wherein at least the first compressor (C1) is used for compressing from P1 to P2 all of said first stream of refrigerant gas leaving (AA) said first heat exchanger (EC1), and at least the second compressor (C2) compressing firstly said third stream (S3) of refrigerant gas leaving said first heat exchanger (EC1) at P2 and secondly said first stream of refrigerant gas compressed to P2 and leaving said first compressor, from P2 to at least P'3, where P'3 is a pressure lower than, or equal to, P3 and higher than P2, thereby obtaining said second stream of refrigerant gas at P3 and T0 after cooling (H1, H2);

wherein:

the series-connected first and second compressors (C1, C2) are coupled respectively to said first and second expanders (E1, E2) consisting of energy-recovery turbines; and at least said first compressor (C1) is coupled to a first motor (M1); and a gas turbine (GT) is coupled either to said second compressor, which compressor compresses said second stream of refrigerant gas directly to P3, or is coupled to a third compressor (C3) connected in series after the second compressor (C2), said third compressor compressing said second stream of refrigerant gas from P'3 to P3, said gas turbine delivering a major portion of the total power delivered to all of said compressors (C1, C2, C3) in use.

10. The method according to claim 8, wherein two compressors (C1, C2) are used that are connected in series, the compressors comprising:

i) the first compressor (C1) coupled to said first expander (E1) compressing from P1 to P2 all of said first stream of refrigerant gas leaving (AA) said first heat exchanger (EC1); and ii) the second compressor (C2) coupled to said second expander (E2), compressing firstly said third stream (S3) of refrigerant gas leaving said first heat exchanger (EC1) at P2 and secondly said first stream of refrigerant gas compressed to P2 and leaving said first compressor from P2 to at least P'3, where P'3 is higher than P2 and lower than or equal to P3, in order to obtain said second stream (S2) of refrigerant gas at P3 and T0 after cooling (H1, H2); and iii) said first compressor (C1) being coupled to the first motor (M1), and said second compressor (C2) being coupled to a gas turbine (GT), said first motor making possible varying the pressure P2 in a controlled manner by delivering power in a controlled manner to said first compressor C1, said first motor (M1) delivering 3% to 30%, of the total power delivered to all of said compressors (C1, C2) in use, said second compressor (C2) driven by a gas turbine (GT) delivering 97% to 70% of the total power used.

11. The method according to claim 8, wherein three compressors (C1, C2, C3) are used that are connected in series and that comprise:
   i) the first compressor (C1) driven by the first motor (M1) and coupled to said first expander (E1), compressing from P1 to P2 all of said first stream of refrigerant gas leaving (AA) said first heat exchanger (EC1); and
   ii) the second compressor (C2) driven by a second motor (M2) coupled to said second expander (E2) compressing firstly said third stream (S3) of refrigerant gas leaving said first heat exchanger (EC1) at P2 and secondly said first stream of refrigerant gas compressed to P2 and leaving said first compressor (C1), from P2 to P'3, where P'3 is higher than P2 and lower than P3; and
   iii) at least one third compressor (C3) driven by a gas turbine (GT) to supply a major portion of the energy and to compress from P'3 to P3 all of the first and third streams of compressed refrigerant gas leaving said second compressor (C2) in order to obtain said second stream of refrigerant gas at P3 and T0 after cooling (H1, H2); and
   iv) wherein the first motor (M1) delivers 3% to 30%, of the total power delivered to all of said compressors (C1, C2, C3) in use, the gas turbine (GT) coupled to said third compressor (C3) and the second motor (M2) coupled to the compressor (C2) together supply 97% to 70% of the total power delivered to all of said compressors (C1, C2, C3) in use.

12. The method according to claim 1, wherein the composition of the gas for liquefying lies within the following ranges to give a total of 100%:
    methane 80% to 100%;
    nitrogen 0% to 20%;
    ethane 0% to 20%;
    propane 0% to 20; and
    butane 0% to 20%.

13. The method according to claim 1, wherein:
    T0 and T0' lie in the range 10° C. to 35° C.; and
    T3 and T3' lie in the range −160° C. to −170° C.; and
    T2 and T2' lie in the range −100° C. to −140° C.; and
    T1 and T1' lie in the range −30° C. to −70° C.

14. The method according to claim 1, wherein:
    P0 lies in the range 0.5 MPa to 5 MPa; and
    P1 lies in the range 0.5 MPa to 5 MPa; and
    P2 lies in the range 1 MPa to 10 MPa; and
    P3 lies in the range 5 MPa to 20 MPa.

15. The method according to claim 7, wherein P2 is caused to vary until the minimum total energy (Ef) consumed in the process is lower than 21.5 kW×d/t of liquefied gas produced.

16. The method according to claim 3, wherein said refrigerant consists essentially of a mixture of nitrogen and said other constituent(s) at a molar content for said other component(s) in the range of 20-40%.

* * * * *